(12) United States Patent
Hunter et al.

(10) Patent No.: US 11,848,220 B2
(45) Date of Patent: Dec. 19, 2023

(54) RFID PART AUTHENTICATION AND TRACKING OF PROCESSING COMPONENTS

(71) Applicant: Applied Materials, Inc., Santa Clara, CA (US)

(72) Inventors: Earl Hunter, Lakeway, TX (US); Russell Duke, Austin, TX (US); Amitabh Puri, San Jose, CA (US); Steven M. Reedy, San Ramon, CA (US)

(73) Assignee: Applied Materials, Inc., Santa Clara, CA (US)

( * ) Notice: Subject to any disclaimer, the term of this patent is extended or adjusted under 35 U.S.C. 154(b) by 145 days.

(21) Appl. No.: 17/180,570

(22) Filed: Feb. 19, 2021

(65) Prior Publication Data

US 2021/0175106 A1 Jun. 10, 2021

Related U.S. Application Data

(63) Continuation of application No. 15/810,628, filed on Nov. 13, 2017, now Pat. No. 10,930,535.
(Continued)

(51) Int. Cl.
*H01L 21/67* (2006.01)
*G05B 19/04* (2006.01)
(Continued)

(52) U.S. Cl.
CPC .... *H01L 21/67294* (2013.01); *G05B 19/0425* (2013.01); *G05B 19/4183* (2013.01);
(Continued)

(58) Field of Classification Search
CPC ........... H01L 27/67294; H01L 63/0492; H01L 21/304; H01L 21/67092; H01L 21/67276;
(Continued)

(56) References Cited

U.S. PATENT DOCUMENTS 4,421,068 A 12/1983 Aral
4,544,375 A 10/1985 Rehmat et al.
(Continued)

FOREIGN PATENT DOCUMENTS

JP 2008093735 A 4/2008
JP 2008-221460 A 9/2008
(Continued)

OTHER PUBLICATIONS

KR Office Action dated Jan. 27, 2022 for Application No. 10-2019-7019012.
(Continued)

*Primary Examiner* — Mohammad Ali
*Assistant Examiner* — Kelvin Booker
(74) *Attorney, Agent, or Firm* — Patterson + Sheridan, LLP

(57) ABSTRACT

Embodiments provided herein provide for methods and apparatus for detecting, authenticating, and tracking processing components, including consumable components or non-consumable components used on substrate processing systems for electronic device manufacturing, such as semiconductor chip manufacturing. The semiconductor processing systems and/or its processing components herein include a remote communication device, such as a wireless communication apparatus, for example, radio frequency identification (RFID) devices or other devices embedded in, disposed in, disposed on, located on, or otherwise coupled to one or more processing components or processing component assemblies and/or integrated within the semiconductor processing system itself. The processing component may include a single component (part) or an assembly of components (parts) that are used within the semiconductor processing tool.

18 Claims, 9 Drawing Sheets

Related U.S. Application Data

(60) Provisional application No. 62/476,626, filed on Mar. 24, 2017, provisional application No. 62/429,726, filed on Dec. 2, 2016.

(51) Int. Cl.

| | |
|---|---|
| *G05B 19/41* | (2006.01) |
| *B24B 1/00* | (2006.01) |
| *B24B 37/20* | (2012.01) |
| *B24B 37/30* | (2012.01) |
| *G05B 19/042* | (2006.01) |
| *G05B 19/418* | (2006.01) |
| *G06K 7/10* | (2006.01) |
| *H04L 9/40* | (2022.01) |
| *H04W 12/06* | (2021.01) |
| *B24B 37/005* | (2012.01) |
| *B24B 7/20* | (2006.01) |

(52) U.S. Cl.
CPC ...... *G06K 7/10366* (2013.01); *H04L 63/0492* (2013.01); *H04W 12/06* (2013.01); *B24B 1/00* (2013.01); *B24B 7/20* (2013.01); *B24B 37/005* (2013.01); *B24B 37/30* (2013.01); *G05B 2219/31322* (2013.01); *G05B 2219/45031* (2013.01)

(58) Field of Classification Search
CPC ............ G05B 19/0425; G05B 19/4183; G05B 2219/31322; G05B 2219/45031; G06K 7/10366; H04W 12/06; B24B 1/00; B24B 37/005; B24B 37/20; B24B 37/30
See application file for complete search history.

(56) References Cited

U.S. PATENT DOCUMENTS

| | | | |
|---|---|---|---|
| 4,995,430 A | 2/1991 | Bonora et al. | |
| 5,023,045 A | 6/1991 | Watnabe et al. | |
| 5,486,995 A | 1/1996 | Krist et al. | |
| 5,521,814 A | 5/1996 | Teran et al. | |
| 5,537,325 A | 7/1996 | Iwakiri et al. | |
| 5,609,511 A | 3/1997 | Moriyama et al. | |
| 5,609,517 A | 3/1997 | Lofaro | |
| 5,667,629 A | 9/1997 | Pan et al. | |
| 5,682,309 A | 10/1997 | Bartusiak et al. | |
| 5,691,895 A | 11/1997 | Kurtzberg et al. | |
| 5,695,660 A | 12/1997 | Litvak | |
| 5,740,033 A | 4/1998 | Wassick et al. | |
| 5,774,633 A | 6/1998 | Baba et al. | |
| 5,799,286 A | 8/1998 | Morgan et al. | |
| 5,954,997 A | 9/1999 | Kaufman et al. | |
| 5,957,751 A * | 9/1999 | Govzman | B24B 37/0053 451/8 |
| 5,967,661 A * | 10/1999 | Renken | G01K 15/00 374/126 |
| 5,969,639 A * | 10/1999 | Lauf | H01Q 3/26 342/368 |
| 5,972,793 A | 10/1999 | Tseng | |
| 5,987,398 A | 11/1999 | Halverson et al. | |
| 6,038,540 A | 3/2000 | Krist et al. | |
| 6,047,579 A | 4/2000 | Schmitz | |
| 6,056,781 A | 5/2000 | Wassick et al. | |
| 6,128,540 A | 10/2000 | Van Der Vegt et al. | |
| 6,157,916 A | 12/2000 | Hoffman | |
| 6,195,593 B1 | 2/2001 | Nguyen | |
| 6,197,604 B1 | 3/2001 | Miller et al. | |
| 6,240,335 B1 | 5/2001 | Wehrung et al. | |
| 6,249,227 B1 | 6/2001 | Brady et al. | |
| 6,263,255 B1 | 7/2001 | Tan et al. | |
| 6,268,641 B1 | 7/2001 | Yano et al. | |
| 6,298,470 B1 | 10/2001 | Breiner et al. | |
| 6,314,641 B1 * | 11/2001 | Akram | G01R 1/0466 438/18 |
| 6,328,802 B1 * | 12/2001 | Miller | H01J 37/32935 118/712 |
| 6,330,971 B1 | 12/2001 | Mabry et al. | |
| 6,351,684 B1 | 2/2002 | Shirley et al. | |
| 6,408,227 B1 | 6/2002 | Singhvi et al. | |
| 6,433,574 B1 * | 8/2002 | Doherty | G01R 1/07385 324/756.05 |
| 6,502,869 B1 | 1/2003 | Rosenquist et al. | |
| 6,526,547 B2 | 2/2003 | Breiner et al. | |
| 6,546,304 B2 | 4/2003 | Thorvaldsson et al. | |
| 6,567,718 B1 | 5/2003 | Campbell | |
| 6,568,989 B1 | 5/2003 | Molnar | |
| 6,693,513 B2 | 2/2004 | Tuttle | |
| 6,738,731 B1 * | 5/2004 | Riley | G01R 31/2831 324/759.02 |
| 6,739,947 B1 | 5/2004 | Molnar | |
| 6,794,310 B1 * | 9/2004 | Miller | G01K 1/024 374/E1.004 |
| 6,803,554 B2 * | 10/2004 | Ye | G03F 7/7085 250/208.1 |
| 6,807,503 B2 * | 10/2004 | Ye | H01L 21/67276 438/18 |
| 6,820,028 B2 * | 11/2004 | Ye | H01L 22/34 438/18 |
| 6,834,212 B1 | 12/2004 | Patel et al. | |
| 6,847,854 B2 | 1/2005 | Discenzo | |
| 6,879,924 B2 * | 4/2005 | Ye | G01D 9/005 438/18 |
| 6,892,156 B2 * | 5/2005 | Ye | H01L 22/34 438/18 |
| 6,901,304 B2 | 5/2005 | Swan et al. | |
| 6,904,328 B2 | 6/2005 | Rietman et al. | |
| 6,941,184 B2 | 9/2005 | Ebert | |
| 6,959,255 B2 * | 10/2005 | Ye | H01L 21/67253 438/18 |
| 6,970,857 B2 | 11/2005 | Card et al. | |
| 6,986,698 B1 | 1/2006 | Molnar | |
| 7,008,300 B1 | 3/2006 | Molnar | |
| 7,020,569 B2 | 3/2006 | Cao et al. | |
| 7,033,260 B2 * | 4/2006 | Togawa | B24B 37/30 451/388 |
| 7,037,172 B1 | 5/2006 | Molnar | |
| 7,050,863 B2 | 5/2006 | Mehta et al. | |
| 7,050,873 B1 | 5/2006 | Discenzo | |
| 7,131,890 B1 | 11/2006 | Molnar | |
| 7,143,016 B1 | 11/2006 | Discenzo et al. | |
| 7,156,717 B2 | 1/2007 | Molnar | |
| 7,158,850 B2 | 1/2007 | Cheng et al. | |
| 7,206,646 B2 | 4/2007 | Nixon et al. | |
| 7,233,874 B2 * | 6/2007 | Ye | G01D 9/005 438/18 |
| 7,423,547 B2 | 9/2008 | Pavlovic et al. | |
| 7,441,320 B2 | 10/2008 | Hass et al. | |
| 7,573,370 B2 | 8/2009 | Becker et al. | |
| 7,575,501 B1 | 8/2009 | Molnar | |
| 7,629,184 B2 * | 12/2009 | Kulp | H01L 21/67248 257/E21.632 |
| 7,712,674 B1 | 5/2010 | Warner et al. | |
| 7,840,305 B2 | 11/2010 | Behr et al. | |
| 7,840,803 B2 | 11/2010 | Clarke et al. | |
| 7,893,833 B2 | 2/2011 | Shachar | |
| 7,945,348 B2 * | 5/2011 | Pannese | H01L 21/67196 414/217 |
| 8,421,600 B2 | 4/2013 | Erickson et al. | |
| 8,779,903 B2 | 7/2014 | Erickson et al. | |
| 8,881,297 B2 | 11/2014 | Gonzalez et al. | |
| 8,946,702 B2 | 2/2015 | Yamazaki et al. | |
| 9,006,024 B2 | 4/2015 | Akimoto | |
| 9,029,863 B2 | 5/2015 | Isobe | |
| 9,048,323 B2 | 6/2015 | Yamazaki et al. | |
| 9,093,988 B2 | 7/2015 | Yamazaki et al. | |
| 9,276,121 B2 | 3/2016 | Yamazaki | |
| 9,403,256 B2 | 8/2016 | Yavelberg | |
| 9,419,146 B2 | 8/2016 | Yamazaki | |
| 9,553,200 B2 | 1/2017 | Isobe et al. | |
| 9,831,238 B2 | 11/2017 | Yamazaki et al. | |
| 11,405,189 B1 * | 8/2022 | Bennison | H04L 9/0656 |
| 2002/0010563 A1 | 1/2002 | Ratteree et al. | |

(56) References Cited

U.S. PATENT DOCUMENTS

| | | | |
|---|---|---|---|
| 2002/0031981 A1* | 3/2002 | Govzman | B24B 37/0053 451/10 |
| 2002/0123818 A1 | 9/2002 | Yamada et al. | |
| 2002/0177917 A1* | 11/2002 | Polla | H01L 21/67248 700/121 |
| 2002/0196047 A1* | 12/2002 | Doherty | H01L 24/97 324/750.25 |
| 2002/0199082 A1 | 12/2002 | Shanmugasundram et al. | |
| 2003/0046130 A1 | 3/2003 | Golightly et al. | |
| 2003/0061004 A1 | 3/2003 | Discenzo | |
| 2003/0083757 A1 | 5/2003 | Card et al. | |
| 2003/0093762 A1 | 5/2003 | Rietman et al. | |
| 2003/0102367 A1 | 6/2003 | Monette et al. | |
| 2003/0139123 A1* | 7/2003 | Somekh | B24B 37/0053 451/289 |
| 2003/0209601 A1 | 11/2003 | Chung | |
| 2003/0227392 A1 | 12/2003 | Ebert et al. | |
| 2004/0008123 A1 | 1/2004 | Carrender et al. | |
| 2004/0098216 A1* | 5/2004 | Ye | H01L 21/67276 702/127 |
| 2004/0148120 A1* | 7/2004 | Ye | G01D 9/005 702/117 |
| 2004/0153279 A1* | 8/2004 | Ye | H01L 21/67253 702/117 |
| 2004/0162692 A1* | 8/2004 | Ye | H01L 21/67276 702/117 |
| 2004/0230396 A1* | 11/2004 | Ye | H01L 21/67253 702/117 |
| 2004/0233040 A1 | 11/2004 | Lane et al. | |
| 2004/0267395 A1 | 12/2004 | Discenzo et al. | |
| 2005/0073435 A1 | 4/2005 | Voeller et al. | |
| 2005/0125184 A1* | 6/2005 | Ye | H01L 21/67276 702/132 |
| 2005/0131763 A1 | 6/2005 | Junger | |
| 2005/0193222 A1 | 9/2005 | Greene | |
| 2005/0236479 A1 | 10/2005 | Schmidtberg et al. | |
| 2005/0256788 A1 | 11/2005 | Mukai | |
| 2006/0027646 A1 | 2/2006 | Haberler | |
| 2006/0043197 A1 | 3/2006 | Chang et al. | |
| 2006/0075820 A1* | 4/2006 | Cobianu | G01L 9/0025 73/703 |
| 2006/0151592 A1 | 7/2006 | Poor | |
| 2006/0164246 A1 | 7/2006 | Ghosh | |
| 2007/0114280 A1 | 5/2007 | Coop et al. | |
| 2007/0146141 A1 | 6/2007 | Popplewell et al. | |
| 2007/0197062 A1* | 8/2007 | Bagley | H01L 21/67294 439/106 |
| 2007/0280601 A1* | 12/2007 | Mendoza | G01D 5/35383 385/37 |
| 2007/0280605 A1* | 12/2007 | Mendoza | G02B 6/12007 385/92 |
| 2008/0004743 A1 | 1/2008 | Goers et al. | |
| 2008/0057830 A1 | 3/2008 | Molnar | |
| 2008/0126414 A1 | 5/2008 | Parimi | |
| 2008/0157928 A1 | 7/2008 | Butler et al. | |
| 2008/0230866 A1* | 9/2008 | Kulp | H01L 21/67248 438/54 |
| 2008/0266057 A1 | 10/2008 | Erickson et al. | |
| 2009/0114549 A1 | 5/2009 | Albright, Jr. | |
| 2009/0305609 A1* | 12/2009 | Khau | B24B 37/04 451/446 |
| 2009/0327715 A1 | 12/2009 | Smith et al. | |
| 2010/0001862 A1 | 1/2010 | Wilson et al. | |
| 2010/0023151 A1* | 1/2010 | Shieh | G05B 19/41885 700/121 |
| 2010/0249976 A1* | 9/2010 | Aharoni | G05B 23/0229 700/121 |
| 2010/0279438 A1 | 11/2010 | An et al. | |
| 2011/0010720 A1 | 1/2011 | Smith et al. | |
| 2011/0010770 A1 | 1/2011 | Smith et al. | |
| 2011/0035043 A1 | 2/2011 | Liu et al. | |
| 2011/0063093 A1 | 3/2011 | Fung et al. | |
| 2012/0061672 A1 | 3/2012 | O'Rourke et al. | |
| 2012/0082063 A1 | 4/2012 | Fujita | |
| 2012/0129301 A1 | 5/2012 | Or-Bach et al. | |
| 2012/0310397 A1 | 12/2012 | Rataul | |
| 2013/0052917 A1 | 2/2013 | Park | |
| 2013/0086385 A1 | 4/2013 | Poeluev | |
| 2013/0093570 A1 | 4/2013 | Erickson et al. | |
| 2013/0140370 A1 | 6/2013 | Finn | |
| 2014/0032378 A1 | 1/2014 | Damnjanovic et al. | |
| 2014/0297545 A1 | 10/2014 | Prasad et al. | |
| 2014/0347968 A1* | 11/2014 | Town | G11B 20/00601 369/275.3 |
| 2015/0254546 A1 | 9/2015 | Hartwick et al. | |
| 2015/0262798 A1 | 9/2015 | Binns et al. | |
| 2015/0360343 A1 | 12/2015 | Yavelberg | |
| 2016/0012498 A1 | 1/2016 | Prasad | |
| 2016/0246892 A1 | 8/2016 | Murrah et al. | |
| 2017/0133252 A1 | 5/2017 | Fung et al. | |
| 2017/0243230 A1 | 8/2017 | Ross et al. | |

FOREIGN PATENT DOCUMENTS

| | | |
|---|---|---|
| JP | 2008310404 A | 12/2008 |
| JP | 2009542449 A | 12/2009 |
| JP | 2010165875 A | 7/2010 |
| JP | 2010286935 A | 12/2010 |
| JP | 2011194509 A | 10/2011 |
| KR | 20090024733 A | 3/2009 |
| KR | 20130012013 A | 1/2013 |
| KR | 2015-0033386 A | 4/2015 |
| TW | 200819243 A | 5/2008 |

OTHER PUBLICATIONS

Taiwan Office Action and Search Report for Taiwan Application No. 106142097 dated Jul. 1, 2021.
Office Action from Chinese Patent Application No. 201780074413.6 dated Oct. 31, 2022.
PCT International Search Report and Written Opinoin dated Mar. 5, 2018, for International Application No. PCT/US2017/061829.
EPO Extended European Search Report dated Jun. 9, 2020, for European Application No. 17875274.7 (APPM/24764EPX).
David Ian Gassett and Christopher William Chiu Hapeman, Radio Frequency Identification (RFID) Applications in Semiconductor Manufacturing,: Jun. 2004, Thesis for Master of Engineering at MIT. (Year: 2004).
Japanese Office Action for Japanese Application No. 2019-529508 dated Oct. 4, 2021.
Korean Office Action for Application No. 10-2019-7019012 dated Jul. 25, 2022.
EPO Extended European Search Report for European Application No. 21212586.8 dated Mar. 15, 2022.
TW Office Action dated Dec. 15, 2021 for Application No. 106142097.
Korean Office Action for Application No. 10-2023-7004300 dated Mar. 21, 2023.
Office Action from Taiwanese Patent Application No. 111131634 dated May 15, 2023.
Japanese Office Action dated Jul. 27, 2023 for JP Application No. 2022-082744.
Korean Office Action for Application No. 10-2023-7004300 (APPM/24764KR02DiV) dated Oct. 28, 2023.

* cited by examiner

RFID PART AUTHENTICATION AND TRACKING OF PROCESSING COMPONENTS

CROSS-REFERENCE TO RELATED APPLICATIONS

This application is a continuation of U.S. patent application Ser. No. 15/810,628, filed on Nov. 13, 2017, now U.S. Pat. No. 10,930,535, issued on Feb. 23, 2021, which claims priority to U.S. Provisional Application Ser. No. 62/429,726, filed on Dec. 2, 2016, and to U.S. Provisional Application 62/476,626, filed on Mar. 24, 2017, all of which are incorporated by reference herein.

BACKGROUND

Field

Embodiments of the present disclosure generally relate to apparatus and methods of authenticating, tracking, and using processing components, such as consumable components, in a substrate processing system. Embodiments described herein further relate to systems and techniques for collecting data in and/or from a substrate processing system and the processing components therein used in an electronic device fabrication process.

Description of the Related Art

Semiconductor chip manufacturing requires multiple types of substrate processing systems. Typically, substrate processing systems require a number of processing components, such as consumable components (components that wear or are used up with use and therefore require regular replacement and/or replenishment) and non-consumable components (typically processing components/parts that are not used up or depleted with use) for the operation thereof. Often, the processing component will have a set of particular characteristics, knowledge of which is important for optimal usage thereof in the substrate processing system.

One example of a processing system herein is a chemical mechanical polishing (CMP) system. CMP is commonly used in the manufacture of high-density integrated circuits to planarize or polish a layer of material deposited on a substrate by contacting the material layer to be planarized with a polishing pad mounted on a polishing platen and moving the polishing pad and/or the substrate (and thus the material layer surface on the substrate) in the presence of a polishing fluid and abrasive particles. CMP systems require a number of consumable components, such as polishing pads, substrate carrier assemblies and the individual components thereof, diamond conditioning disks, and other components that wear with use and require regular replacement and/or replenishment. The use of authenticated consumable components, for example, consumable components from a qualified supplier and/or authorized supplier, in the polishing process is critical as the usage of unauthenticated consumable components, for example, counterfeit components, consumable components from an unqualified supplier, and/or unauthorized supplier or a consumable component that is incompatible with a specific process, can lead to unsafe processing conditions and/or unreliable polishing results. In addition, individual consumable components used on and/or with the CMP system often have particular characteristics for which the CMP system may need to be configured in order to optimally and/or safely use the consumable component and/or a corresponding CMP system part related thereto.

Polishing pads, substrate carrier assemblies and the individual components thereof, and other conventional CMP system processing components often lack devices and/or methods to enable functions such as detecting failures, authenticating genuine and/or authorized components, tracking useful data relating to the system or component parts, sensing process conditions or useful data, and monitoring aspects of the CMP process or other useful process information.

Therefore, there is a need in the art for devices and methods that provide processing component authentication and/or tracking to assure process repeatability and reliability and thereby improve device yield and ensure safe operation of the processing system. There is also a need for systems, consumable parts, and other apparatus that can detect and authenticate a tool supplier's equipment processing components/parts to assure part quality and system reliability. There is a need for electronic device manufacturing substrate processing systems and processing components, including consumable components that provide improved polishing performance and desirable process sensing capabilities. In addition, there is a need for methods of manufacturing such devices.

SUMMARY

Embodiments of the disclosure generally relate to substrate processing systems used in an electronic device fabrication process. More specifically, embodiments described herein relate to remote tracking and authentication of processing components used in, on, or with substrate processing systems used in an electronic device fabrication process. For example, chemical mechanical polishing (CMP) systems, chemical vapor deposition (CVD) chambers, physical vapor deposition (PVD) chambers, ion implantation chambers, etch processing systems and/or chambers, photolithography processing systems, substrate thinning system (e.g., backgrind), processing systems related thereto, and other processing systems used in the manufacturing of electronic devices, such as semiconductor devices.

In one embodiment, a method of processing a substrate using a processing component disposed within a substrate processing system is provided. The method comprises receiving, using an interrogator, one or more signals from a remote communication device coupled to a processing component disposed in the substrate processing system. Herein, the one or more signal comprises information relating to the processing component. The method further comprises comparing, using a controller, the identifier information to processing component identifiers stored in a database to authenticate the processing component and performing, using the controller, one or more substrate processing operations based on the authentication of the processing component.

In another embodiment, a method of processing a substrate using a processing component disposed within a substrate processing system comprises delivering one or more signals to a remote communication device that comprises an RFID tag. Herein, the remote communication device is disposed on a processing component within the substrate processing system. The method further comprises storing information received in the one or more signals within a memory of the remote communication device before removing the processing component from the substrate processing system and receiving at least a portion of the stored information from the remote communication device after the processing component has been reinstalled within the substrate processing system.

In another embodiment method of processing a substrate using a processing component disposed within a substrate processing system comprises receiving, via an interrogator, one or more signals from an RFID tag, wherein the one or more signals include information relating to one or more processing parameters detected by a sensor coupled to the processing component and analyzing the one or more signals using a controller adapted to control a process performed within the substrate processing system, wherein the controller initiates a change in the polishing process in response to the received one or more signals.

In one embodiment, the substrate processing system includes a carousel support plate having a slot surrounding a carrier drive shaft coupled to a substrate carrier assembly. The substrate carrier assembly includes an RFID tag disposed therein to communicate with an interrogator circling around the carousel support plate's slot. The interrogator and the RFID tag are configured to communicate with one another using a wireless communication technique.

In another embodiment, the substrate processing system comprises a processing chamber including a target having an RFID tag disposed within or thereon and an interrogator embedded within a dielectric support disposed in an interior volume of the processing chamber. The interrogator and the RFID tag are configured to communicate with one another using a wireless communication technique.

In another embodiment, the substrate processing system comprises a processing chamber including a magnetron having a magnet, with an RFID tag embedded therein and an interrogator embedded within a yoke or a process piece. The interrogator and the RFID tag are configured to communicate with one another using a wireless communication technique.

Certain embodiments provide a method of processing a substrate using a processing component disposed within a substrate processing system. The method includes receiving, using an interrogator, one or more signals from an RFID tag coupled to a processing component during processing, wherein the one or more signal comprises information relating to the processing component, authenticating, using the controller, the processing component based on the one or more signals, and performing, using the controller, one or more substrate processing operations based on the one or more signals.

Certain embodiments provide a method of processing a substrate using a processing component disposed within a substrate processing system. The method includes delivering one or more signals to a remote communication device that comprises an RFID tag, wherein the remote communication device is disposed on a processing component within the substrate processing system, storing information received in the one or more signals within a memory of the remote communication device before removing the processing component from the substrate processing system, and receiving at least a portion of the stored information from the remote communication device after the processing component has been reinstalled within the substrate processing system.

Certain embodiments provide a method of processing a substrate using a processing component disposed within a substrate processing system. The method includes receiving, via an interrogator, one or more signals from the RFID tag, wherein the one or more signals include information relating to one or more processing parameters detected by a sensor coupled to the processing component and analyzing the one or more signals using a controller adapted to control a process performed within the substrate processing system, wherein the controller initiates a change in the polishing process in response to the received one or more signals.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
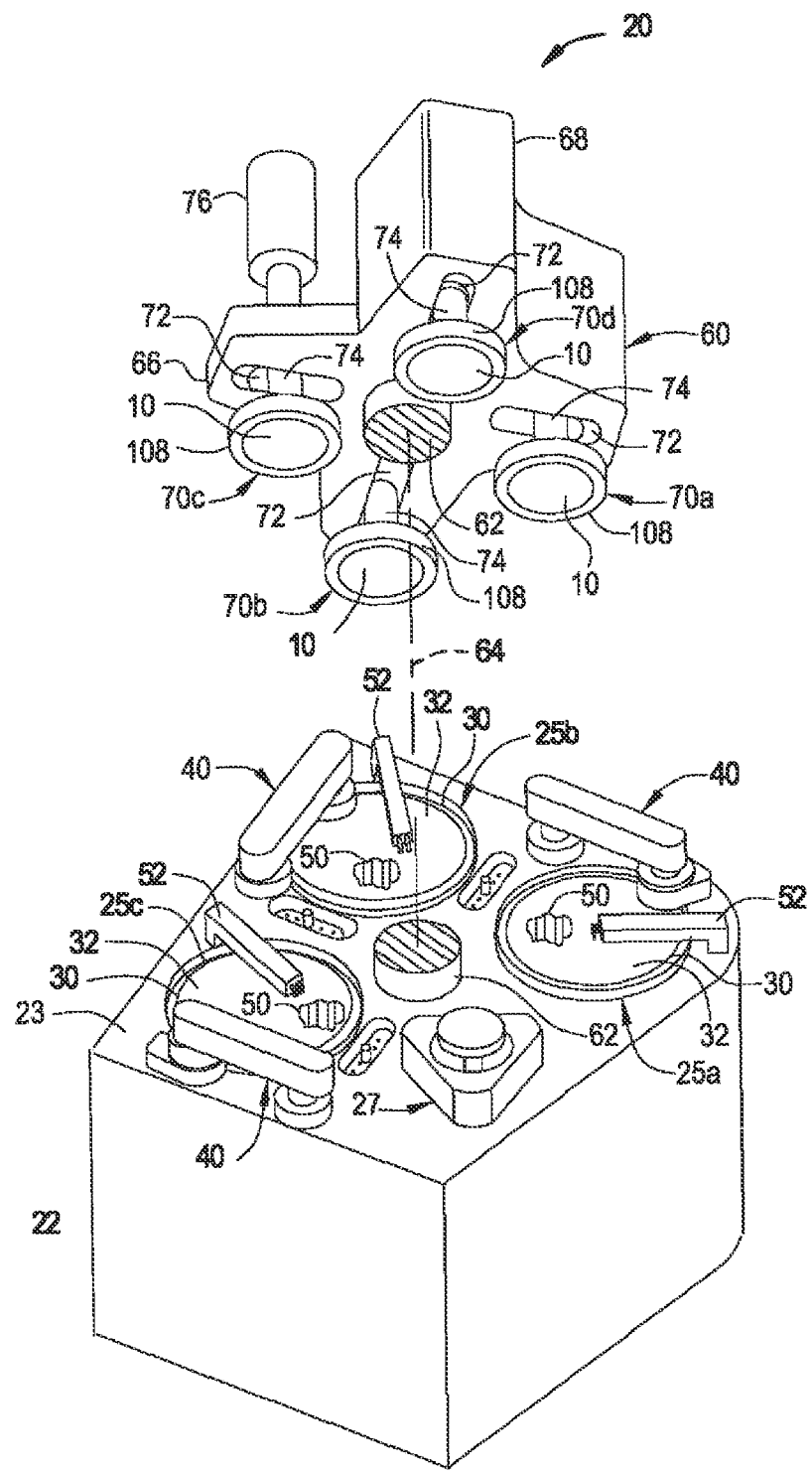
FIG. 1A is an exploded schematic perspective view of an example of a substrate processing system, here a substrate polishing system, adapted to benefit from the embodiments described herein.

Embodiments of the disclosure generally relate to substrate processing systems used in an electronic device fabrication process. More specifically, embodiments described herein relate to remote tracking and authentication of processing components used in, on, or with substrate processing systems used in an electronic device fabrication process, such as chemical mechanical polishing (CMP) systems, chemical vapor deposition systems (CVD), physical vapor deposition (PVD) systems, ion implantation systems, etch processing systems, photolithography processing systems, and other processing systems used in the manufacturing of electronic devices.

The example substrate processing systems described herein include chemical mechanical polishing (CMP) systems and physical vapor deposition (PVD) systems. However, the embodiments described herein may be used with any substrate processing system that would benefit from remote tracking and authentication of processing components used therein, such as chemical vapor deposition systems (CVD), physical vapor deposition (PVD) systems, ion implantation systems, etch processing systems, photolithography processing systems, and substrate thinning systems (e.g., backgrind). The example substrate processing systems herein include processing components used in, with, or on the substrate processing system, including non-consumable components and consumable components, having one or more remote communication devices, such as wireless communication devices, including radio frequency identification (RFID) devices and/or other suitable wireless communication devices, disposed on, disposed within, embedded within, located on, or otherwise coupled thereto to enable the authentication and tracking thereof.

Processing components herein include single non-consumable components, single consumable components, and assemblies of non-consumable components and/or consumable components that are used in, on, and/or with the substrate processing system. Methods herein include receiving, using an interrogator, one or more signals from a remote communication device, such as an RFID tag, disposed on, disposed within, embedded within, located on, or otherwise coupled to a processing component of the semiconductor processing system before, during, and/or after substrate processing. The one or more signals include information relating to the processing component. Methods herein further include authenticating, using the controller, the processing component based on the one or more signals, and performing, using the controller, one or more substrate processing operations based on the one or more signals. In some other embodiments, methods include delivering one or more signals to a remote communication device that comprises an RFID tag, wherein the remote communication device is disposed on, disposed within, embedded within, located on, or otherwise coupled to a processing component within the substrate processing system, storing information received in the one or more signals within a memory of the remote communication device before removing the processing component from the substrate processing system, and receiving at least a portion of the stored information from the remote communication device after the processing component has been reinstalled within the substrate processing system. In yet some other embodiments, methods include receiving, via an interrogator, one or more signals from the RFID tag, wherein the one or more signals include information relating to one or more processing conditions detected by a sensor coupled to the processing component and analyzing the one or more signals using a controller adapted to control a process performed within the substrate processing system, wherein the controller initiates a change in the polishing process in response to the received the one or more signals.

Figure 1B:
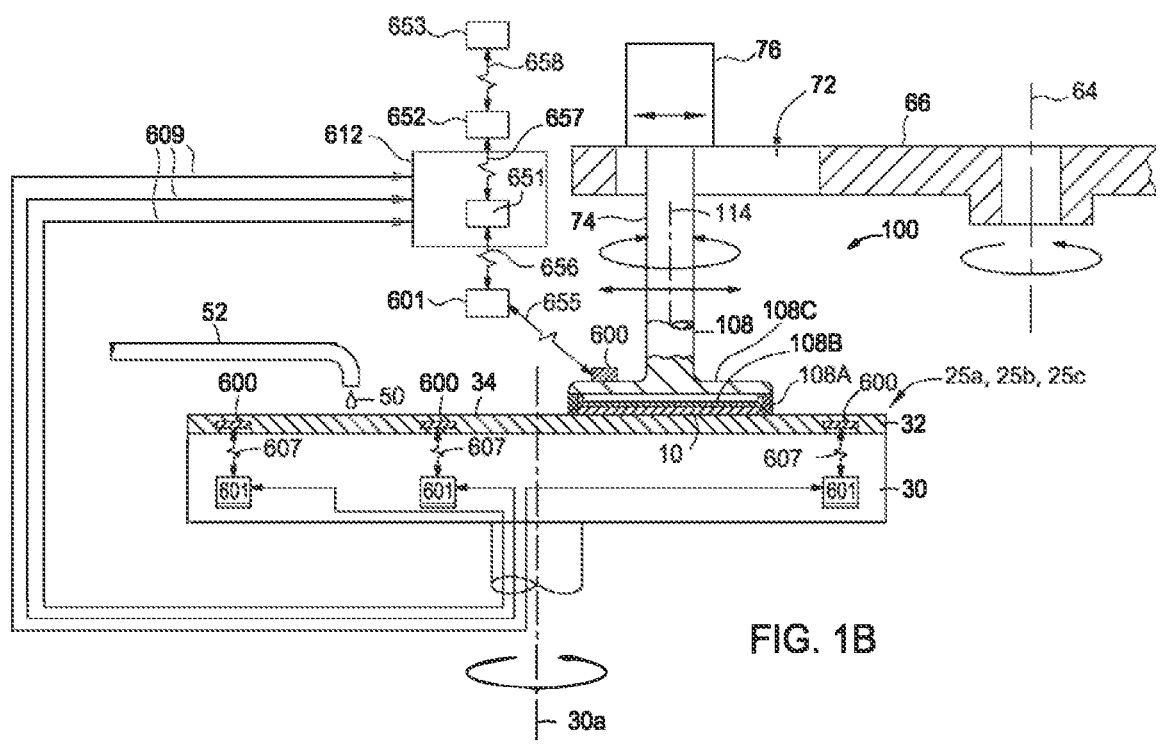
FIG. 1B is a cross-sectional view of a portion of the polishing system of FIG. 1A.

FIG. 1A is an exploded schematic perspective view of an example polishing system, according to one embodiment. FIG. 1B is a cross-sectional view of a portion of the polishing system 20 of FIG. 1A. The polishing system 20 includes a machine base 22 with a tabletop 23 mounted thereon and a removable upper outer cover (not shown). The tabletop 23 supports a plurality of polishing stations 25a, 25b, and 25c, and a transfer station 27 for loading and unloading each of the plurality of substrates 10 to and from each of the plurality of substrate carrier assemblies 108. Herein, the transfer station 27 forms a generally square arrangement with the plurality of polishing stations 25a, 25b, and 25c.

Each of the polishing stations 25a-c herein includes a polishing platen 30 having a polishing pad 32 mounted thereon and/or secured thereto using an adhesive, such as a pressure-sensitive adhesive. Each of the polishing platens 30 herein are operably coupled to a respective platen drive motor (not shown) disposed in the machine base 22, which rotates the polishing platen 30 about an axis disposed therethrough, such as the platen axis 30a shown in FIG. 1B. Herein, each of the polishing stations 25a-c further include a pad conditioning assembly 40 comprising a pad conditioner, such as an abrasive disk or a brush, used to maintain a desired surface texture of the polishing pad 32, and/or clean polishing byproducts therefrom, and thereby provide consistent polishing results across the lifetime thereof of the polishing pad 32. Herein, each of the plurality of polishing platens 30 and the polishing pads 32 disposed thereon have a surface area that is greater than the to-be-polished surface area of the substrate 10. In some polishing systems, the polishing platens 30 and/or the polishing pad 32 disposed thereon have a surface area that is less than the to-be-polished surface area of the substrate 10.

During polishing, a polishing fluid 50 is introduced to the polishing pad 32 through a fluid dispenser 52 positioned over the polishing platen 30. Typically, the polishing fluid 50 is a polishing slurry comprising abrasive particles, a cleaning fluid, water, or a combination thereof. In some embodiments, the polishing fluid 50 comprises a pH adjuster and/or chemically active components, such as an oxidizing agent, to enable chemical mechanical polishing of the material surface of the substrate 10 in conjunction with abrasives particles suspended in the polishing fluid 50 and/or embedded in the polishing pad 32. In some embodiments, the fluid dispenser 52 includes one or more spray nozzles (not shown) which provide a high-pressure rinse of polishing pad 32 at the end of each substrate polishing and/or pad conditioning cycle.

The polishing system 20 further includes a carousel 60 positioned above the machine base 22. The carousel 60 includes a carousel support plate 66 and a cover 68. Herein, the carousel support plate 66 is supported by a center post 62 and moved about a carousel axis 64 thereof by a carousel motor assembly (not shown) disposed in the machine base 22. The carousel 60 includes a plurality of substrate carrier systems 70a, 70b, 70c, and 70d mounted on the carousel support plate 66 at equal angular intervals about the carousel axis 64. During operation of the polishing system 20, a substrate 10 is loaded to and/or unloaded from one of the substrate carrier systems, such as substrate carrier system 70d, while the remaining plurality of substrate carriers systems, such as 70a-c, are used to polish a respective plurality of substrates 10. The carousel moves the substrate carrier systems 70a-d, and the substrates disposed therein, between desired polishing stations 25a-c and/or the transfer station 27 by moving the substrate carriers systems 70a-70d coupled thereto about the carousel axis 64.

Each of the substrate carrier systems 70a-d herein includes a substrate carrier assembly 108, a carrier drive shaft 74 coupled to the substrate carrier assembly 108 and extending through a radial slot 72 formed in the carousel support plate 66, and a substrate carrier assembly rotation motor 76 operably coupled to the carrier drive shaft 74. Each of the substrate carrier assemblies 108 independently rotate about a carrier axis 114 disposed through a respective carrier drive shaft 74. Herein, each substrate carrier assembly rotation motor 76 and the carrier drive shaft 74 operably coupled thereto is supported on a slider (not shown) which is linearly driven along the radial slot 72 by a radial drive motor (not shown) to laterally oscillate the respective substrate carrier assembly 108.

Herein, the substrate carrier assembly 108 includes a carrier housing 108C, a substrate retaining ring 108A coupled to the carrier housing 108C that surrounds a substrate 10, and a flexible diaphragm 108B, such as a flexible membrane, disposed between the carrier housing 108C and a substrate 10 disposed in the substrate carrier assembly 108. During polishing, each of the substrate carrier assemblies 108 positioned at a respective polishing station 25a-c lower a substrate 10 into contact with a respective polishing pad 32. A downforce on the substrate retaining ring 108A urges the substrate retaining ring 108A against the respective polishing pad 32, thereby preventing the substrate 10 from slipping from the substrate carrier assembly 108. The substrate carrier assembly 108 rotates about a respective carrier axis 114 while the flexible diaphragm 108B urges the to-be-polished surface of the substrate 10 against the polishing surface of the polishing pad 32. In embodiments herein, the flexible diaphragm 108B is configured to impose different pressures against different regions of a substrate 10 while urging the to-be-polished surface of the substrate 10 against the polishing surface of the polishing pad 32. Typically, each of the polishing platens 30 rotates about a respective platen axis 30a in an opposite rotational direction from the rotational direction of the substrate carrier assembly 108, while the substrate carrier assembly 108 oscillates from an inner diameter of the polishing platen 30 to an outer diameter of the polishing platen 30 to, in part, reduce uneven wear of the polishing pad 32. Typically, the substrate 10 is polished using a predetermined set of polishing process parameters, herein polishing process variables, selected for the type of substrate 10 to-be-polished, which together comprise a polishing process recipe. As used herein, process parameters, including process variables, are setpoints used to control the polishing process while processing conditions are measured values received from the polishing system 20, sensors therein, and/or components thereof, Examples of polishing process variables herein include, but are not limited to, rotation speed of the polishing platen 30, rotation speed of the substrate carrier assembly 108, flowrate of the polishing fluid 50, temperature of the polishing platen 30, downforce on the substrate retaining ring 108A, downforce on the substrate 10 which includes pressure(s) exerted on the substrate 10 and/or on regions thereof by the flexible diaphragm 108B, sweep speed of the substrate carrier assembly 108, sweep speed of the pad conditioning assembly 40, downforce on the pad conditioner (the force exerted on the polishing pad by the pad conditioner), rotation speed of the pad conditioner, number of conditioning cycles (sweeps) or duration of conditioning (sec.), and sometimes polishing time. Often, specific types of processing components are required for use with some polishing process recipes and are prohibited for use with others as some types of processing components are incompatible with some substrate polishing processes and are therefore unauthorized for use therewith. In other embodiments, some processing components, or assemblies thereof, are prohibited for use with some substrate polishing processes based on the usage history. For example, a substrate carrier assembly 108 and/or the individual components thereof that has been used in a metal polishing process, such as a copper polishing process, might be unauthorized for use with a shallow trench isolation process (STI) as contaminates from the copper polishing process will cause failures in the electronic devices on the substrate if introduced to the substrate during the STI polishing process.

The polishing pads 32, substrate carrier assemblies 108 and the processing components thereof, and other processing components manufactured by conventional techniques often lack devices and/or methods to enable functions such as the detecting, authenticating, tracking, sensing, and monitoring thereof by the polishing system 20 and/or other automated control systems external thereto. Accordingly, certain embodiments described herein provide one or more apparatus and methods for data communication between the polishing system 20 and/or control systems external thereto and one or more of its processing components, which enable the functions described herein.

Information Collection System Configuration Examples

As shown in FIG. 1B, a substrate carrier assembly 108 is coupled to a carrier drive shaft 74, which extends through radial slot 72 to couple the substrate carrier assembly 108 to the substrate carrier assembly rotation motor 76. The substrate carrier assembly 108 rotates about the carrier axis 114 and oscillates in a sweeping motion to provide a relative motion between the material surface of the substrate 10 and the polishing pad 32. As described above, the substrate carrier assembly 108 includes a number of processing components, including a carrier housing 108C coupled directly or indirectly to the carrier drive shaft 74, a substrate retaining ring 108A, and a flexible diaphragm 108B. Typically, one or more of the processing components of the substrate carrier assembly 108 is a consumable component that becomes worn with use and requires regular replacement in order to provide a consistent and desirable polishing performance.

Herein, FIG. 1B further illustrates a plurality of remote communication devices 600, such as an RFID device, and a plurality of interrogators 601, disposed on, disposed within, embedded within, located on, or otherwise coupled to a plurality of processing components of the polishing system 20. In one embodiment, the plurality of remote communication devices 600 are disposed in and/or on the polishing pads 32 and disposed on, disposed within, embedded within, located on, or otherwise coupled to the substrate carrier assemblies 108, including the non-consumable and consumable components thereof, such as the carrier housings 108C, the substrate retaining rings 108A, and the flexible diaphragms 108B. Herein, the plurality of interrogators 601 are disposed on, disposed within, embedded within, located on, or otherwise coupled to various processing components of the polishing system 20, including on the carousel support plates 66, the substrate carrier system 70 supporting structures, and the plurality of polishing platens 30.

Herein, each of the plurality of remote communication devices 600, such as RFID devices, are configured to wirelessly communicate with one or more of the plurality of interrogators 601. Examples of wireless communication protocols include near field communication techniques, Bluetooth®, optical signal transmission techniques, acoustic signal transmission techniques, radio frequency communication techniques, and other suitable wireless communication techniques. In other embodiments, communication devices (not shown) are hardwired to the interrogator 601 to facilitate communication therebetween. Like the remote communication devices 600, the interrogators 601 are positioned within and/or on various areas or parts of polishing system 20. In some embodiments, the interrogator's 601 locations are independent of the respective remote communication devices 600's locations. In other embodiments, the location of each of the interrogators 601 are determined, at least in part, by the location of the respective remote communication device 600 to facilitate communication therebetween.

As described above, one or more of the plurality of remote communication devices 600 are disposed on, disposed within, embedded within, located on, or otherwise coupled to one or more processing components, which herein include at least one or more of the processing components used by the polishing system 20 described above, such as the substrate carrier assemblies 108, the consumable components thereof, and the polishing pads 32. In one embodiment, one or more remote communication devices 600 are disposed within, embedded within, and/or otherwise coupled to a polishing pad 32 while one or more interrogators 601 are disposed within or otherwise coupled to a respective polishing platen 30 having the polishing pad 32 disposed thereon. Herein, the remote communication devices 600 coupled to the polishing pad 32 and their respective interrogators 601 embedded in the polishing platen 30 are configured to communicate via a communication link 607. In some embodiments, the communication link 607 is a wireless communication protocol. In another embodiment, the communication link 607 is a wired connection. Typically, each of the interrogators 601 is communicatively coupled to a controller 612 of the polishing system 20, which receives signal input from the remote communication devices 600 via the respective interrogators 601 through communication links 609. The input received from remote communication devices 600, through the interrogators 601, are processed and utilized by the controller 612 using one or more software applications, such as the middleware application 651, the software application, and/or the fab-level software application 653. In other embodiments, an external controller (not shown) receives and processes input from the interrogators 601.

FIG. 1B further illustrates a logical view of a software application hierarchy, which herein includes a middleware application 651, an equipment software application 652, and a fab-level software application 653. In some embodiments, after receiving signal input from one or more interrogators 601, the controller 612 uses a middleware application 651 to process the input and derive data that the middleware application 651 sends to the equipment software application 652 through a communication link 657. The communication link 657 herein comprises a wired connection (e.g., Ethernet) and/or a wireless communication protocol. In some embodiments, the equipment software application 652 further sends the data received from the middleware application 651 to the fab-level software application 653 through a communication link 658. Herein, the communication link 658 is a wired connection. In other embodiments, the communication link 658 is a wireless communication protocol.

In some embodiments, information is sent in the opposite direction, so that information from the controller 612 is received and stored in one or more of the remote communication devices 600. For example, in one embodiment described in FIG. 4, each one of the fab-level software application 653, the equipment software application 652, and the middleware application 651 are configured to send information to be stored in one or more of the remote communication devices 600. Accordingly, in some embodiments, communication between remote communication devices 600, interrogator 601, and controller 612, as well as all the different levels of software application hierarchy (e.g., 651, 652, and 653), comprise a two-way communication.

In some embodiments, the remote communication devices 600 are disposed on, disposed within, embedded within, located on, or otherwise coupled to the substrate carrier assembly 108 and/or the processing components thereof. In one embodiment, as shown in FIG. 1B, one or more remote communication devices 600 are located on a surface of the substrate carrier assembly 108 distal from the to-be-polished surface of a substrate 10 disposed therein. In another embodiment, one or more remote communication devices 600 (not shown) are embedded within the carrier housing 108C of the substrate carrier assembly 108, where the carrier housing 108C is securable to the carrier drive shaft 74 and from which the carrier housing 108C is movably suspended. To communicate with a remote communication device 600 disposed in, on, or otherwise coupled to a substrate carrier assembly 108, an interrogator 601 (shown in FIGS. 2A-B) is disposed within or located on one or more parts of the carousel support plate 66. For example, in some embodiments, an interrogator 601 is proximate to the radial slot 72 formed in carousel support plate 66, as further described below in relation to FIGS. 2A-B.

As shown in FIG. 1B, the remote communication devices 600 disposed on the carrier housing 108C of the substrate carrier assembly 108, and the respective interrogator 601 in communication therewith are configured to communicate via a communication link 655. In some embodiments, the communication link 655 comprises a wireless communication protocol. In other embodiments, the communication link 655 comprises a wired connection. It is generally desirable to use a wireless communication technique (e.g., NFC, RF, Bluetooth, etc.) in configurations where a remote communication device 600 is disposed on a processing component that moves relative to another processing component and/or portion of the polishing system 20 that has a corresponding interrogator 601 disposed thereon. The interrogator 601 is further communicatively coupled to a controller 612, which receives input from the remote communication devices 600 via the interrogator 601. Herein, the communication link 656 between the interrogator 601 and the controller 612 comprises a wired connection, a wireless communication protocol, or a combination thereof.

Figure 4:
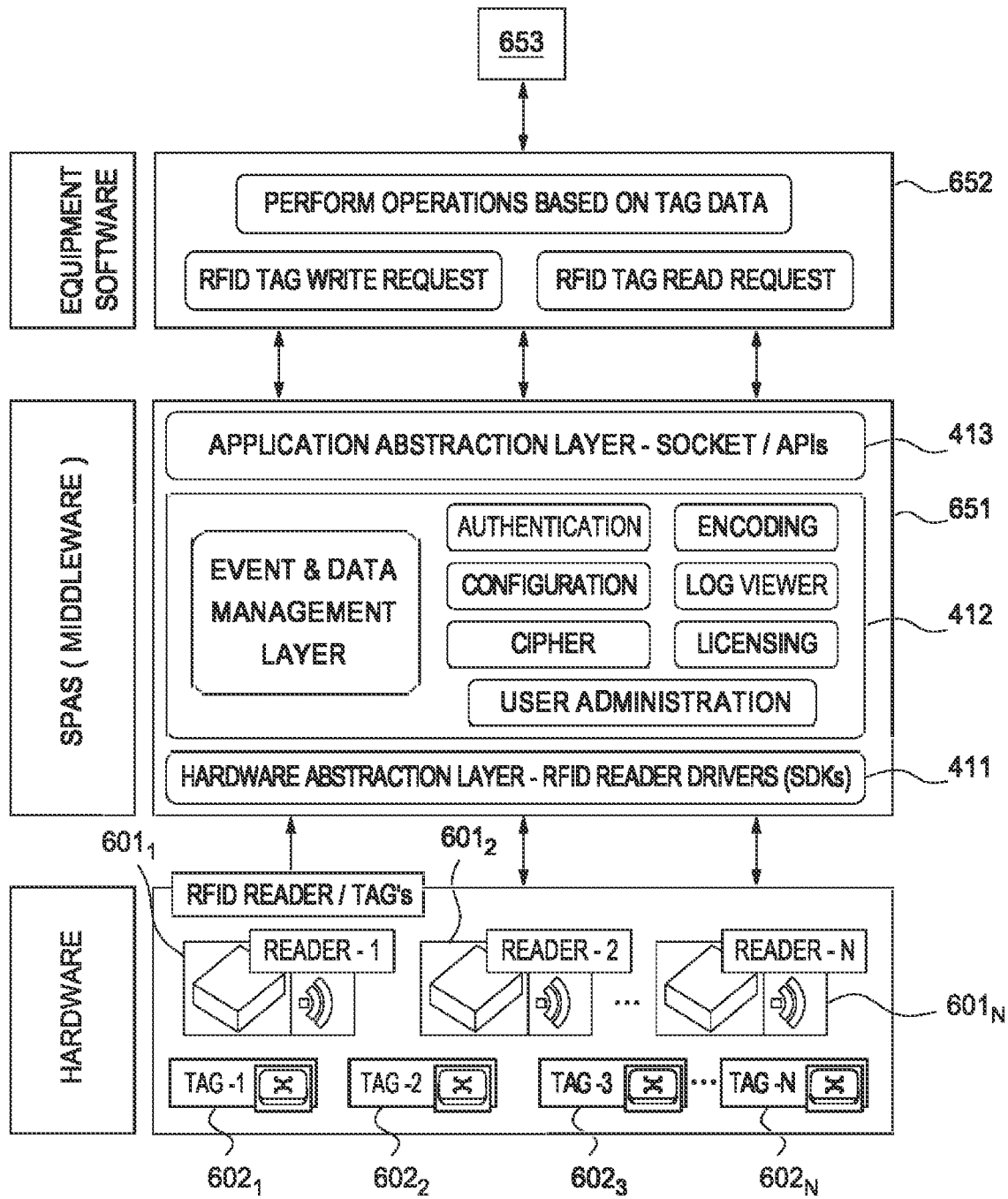
FIG. 4 illustrates a logical view of the software application hierarchy of FIG. 1B, according to some embodiments described herein.

After receiving the input from a remote communication device 600 coupled to the substrate carrier assembly 108, an interrogator 601 transmits the input to the controller 612, which, in one embodiment, processes the input using the middleware application 651 as described further in relation to FIG. 4. As shown, the transmission of the input from an interrogator 601 to the middleware application 651 is performed through the communication link 656. In some embodiments, the input received by the middleware application 651, is then translated and sent to the equipment software application 652 through the communication link 657. Herein, the communication link 657 is a wired connection or a wireless communication protocol. Further, in some embodiments, after receiving the information from the middleware application 651, the equipment software application 652 is configured to send the information to a fab-level software application 653. In other embodiments, the information from the interrogator 601 is communicated directly to the fab-level software application through a wired or wireless communication link (not shown). In embodiments herein, communication between the remote communication devices 600, the interrogators 601, and the controller 612, as well as all the different levels of software applications (e.g., 651, 652, and 653), comprises a two-way communication path, meaning that information is both sent and received by the fab-level software application 653, the controller 612, the equipment software application 652, and/or the middleware application 651 to and from the remote communication devices 600 via the interrogators 601 and through the communication links 607, 609, 655, 656, 657, and/or 658. In other embodiments, communication between the remote communication devices 600, the interrogators 601, and the controller 612 as well as all the different levels of software applications (e.g., 651, 652, and 653) comprises a one-way communication path, meaning that information is received by the fab-level software application 653, the controller 612, the equipment software application 652, and/or the middleware application 651 from the remote communication devices 600 via the interrogators 601 and through the communication links 607, 609, 655, 656, 657, and/or 658 but is not sent to the remote communication devices 600

Figure 2A:
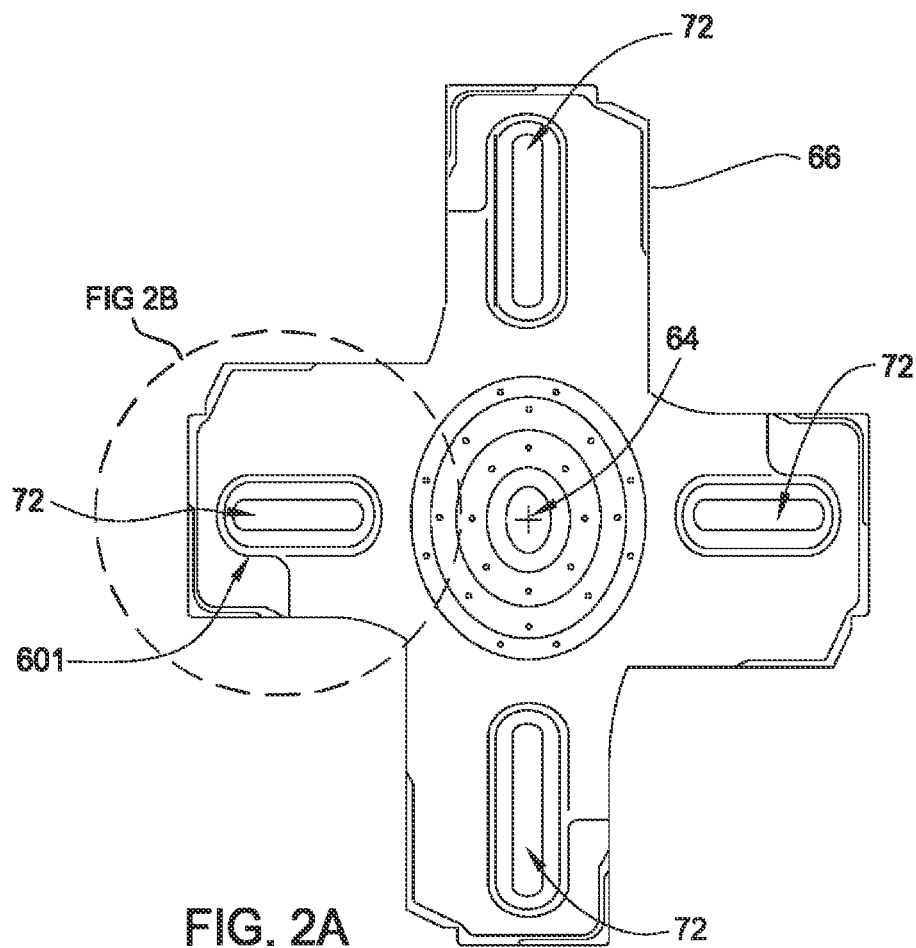
FIG. 2A is a schematic plan view of the carousel support plate of FIG. 1B, which illustrates interrogators positioned around the radial slots thereof, according to one embodiment.
Figure 2B:
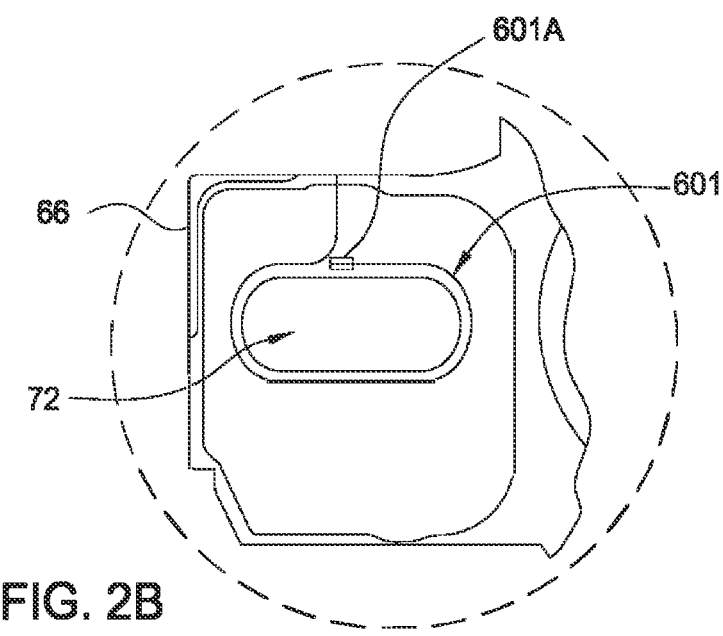
FIG. 2B is a close-up view of a portion of the carousel support plate 66 illustrated in FIG. 2A.

FIG. 2A is a schematic plan view of a carousel support plate, such as the carousel support plate 66 of the polishing system 20 described in FIGS. 1A-B, according to one embodiment. FIG. 2B is a close-up view of a portion of the carousel support plate 66 described in FIG. 2A. To facilitate communication with a remote communication device 600 coupled to a substrate carrier assembly 108 and/or the components thereof, an interrogator 601 is typically disposed within or located on one or more parts of carousel support plate 66. Herein, the carousel support plate 66 includes four radial slots 72 formed therein that allow each of the substrate carrier assemblies 108 to independently rotate and oscillate relative thereto. Each of the interrogators 601 disposed on the carousel support plate 66 are positioned proximate to, and about one of, the radial slots 72 formed in carousel support plate 66. This enables each interrogator 601, positioned around each radial slot 72, to be in close proximity with a corresponding remote communication device 600 coupled to a substrate carrier assembly 108. Accordingly, the respective remote communication devices 600 and interrogators 601 may communicate wirelessly, as further described in relation to FIG. 3.

Figure 3:
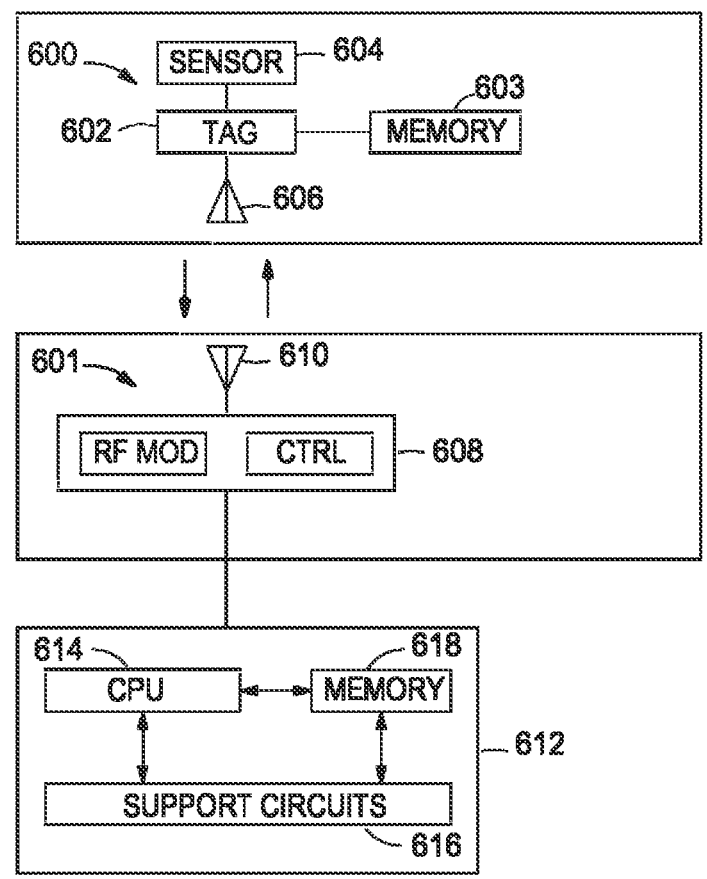
FIG. 3 illustrates a partial and schematic view of the wireless communication apparatus, interrogator, and controller of FIG. 1B, according to some embodiments described herein.

FIG. 3 illustrates a partial and schematic view of an exemplary remote communication device 600, interrogator 601, and controller 612, in communication therebetween, according to embodiments described herein. The remote communication device 600 shown in FIG. 3 is a wireless communication RFID device. As described above, in some embodiments, one or more remote communication devices 600 are disposed within the polishing pads 32 while one or more corresponding interrogators 601 are disposed within each of the respective polishing platens 30. In some embodiments, one or more remote communication devices 600 are located on, embedded within, or otherwise coupled to the substrate carrier assemblies 108, and/or the processing components thereof, while one or more corresponding interrogators 601 are positioned around each radial slot 72 formed in the carousel support plate 66.

While a single remote communication device 600 and a single interrogator 601 are illustrated in FIG. 3, it is con-templated that the polishing system 20 and the processing components used therewith will comprise a plurality of remote communication devices 600 and corresponding interrogators 601, such as those disposed within, embedded within, located on, or otherwise coupled to the plurality of polishing pads 32 and their respective polishing platens 30 and the plurality of substrate carrier assemblies 108 and the respective radial slots 72 formed in the carousel support plate 66. In some embodiments, more than one remote communication device 600 may be sensed by a single corresponding interrogator 601.

As shown in FIG. 3, each of the plurality of interrogators 601 includes a reader 608 and an antenna 610. Typically, the reader 608 includes and/or is coupled to a power source, such as an RF power source, and is configured to transmit, via the antenna 610, a signal to be received by the remote communication device 600. In some embodiments, the antenna 610 comprises coaxial cables positioned around each radial slot 72 formed in carousel support plate 66 as shown in FIG. 3. In such embodiments, positioning the cables around the radial slots in a circumferential manner enables propagating an RF energy to a tag 602, such as an RFID tag, of the remote communication devices 600 from different angles, thereby increasing the likelihood that the transmitted RF energy is received by the tag 602. Herein, each of antennas 610 terminates at each of the end covers of the CMP head support structure. At the other end, the coaxial cable of antenna 610 includes a printed circuit board 610A that contains one or more electrical components configured to facilitate the communication between the antenna 610 and the remote communication device 600.

In addition, the carousel support plate 66, shown in FIG. 2A, supports the plurality of substrate carrier systems 70a-d that independently rotate and oscillate in the plurality of radial slots 72. Accordingly, in some embodiments, an equivalent number of remote communication devices 600 on and/or in each of the substrate carrier assemblies 108 and/or the processing components thereof, as well as a corresponding number of interrogators 601, including their antennas 610, encircling each of the four radials slots 72. In some embodiments, to avoid cross-talk such that the RF energy propagated by an interrogator 601 is only picked up by the desired remote communication devices 600 (and not another remote communication device 600), a specific range of RF energy is utilized for each of the interrogators 601 and the remote communication devices 600 in respective communication therewith. In such embodiments, the RF energy has an RSSI value in the range of −30 to −60 dB. Also, in some embodiments, an interrogator 601 may emit ultrahigh frequency (UHF) in the range of 856 to 960 MHz. In some configurations, each of the remote communication devices 600 has a unique identification code that is stored within the memory thereof. The unique identification code is transmitted to the interrogator 601 and used by the middleware application 651 within the controller 612 to determine which of two or more remote communication devices data is received from and/or which remote communication devices 600 information is to be transferred to during one or more of the processes described herein.

In some embodiments, the reader 608 includes, among other components, an RF modulator and an interrogator controller configured to manage signal transmission and reception by the reader 608. In one embodiment, the RF modulator is configured to generate and/or modulate an RF signal having a wavelength of about 13.56 MHz. In one passive tag embodiment, the interrogator 601 and the remote communication devices 600 are positioned in a spatial relationship having a distance of less than about twelve inches, such as less than about two inches or less than about one inch. In an active tag embodiment, the spatial relationship between the interrogator 601 and the remote communication device 600 may be greater than the passive tag embodiments and is dependent upon the power available for signal transmission.

Also shown in FIG. 3 is a remote communication device 600, which generally includes a tag 602, memory 603, and an antenna 606 that is coupled to or integrally manufactured in the tag 602. In some embodiments, a sensor 604 is communicatively coupled to the tag 602. Herein the tag 602 is an active tag or a passive tag, depending upon the desired implementation. In an active tag embodiment, a power source, such as a battery, is electrically coupled to the tag 602 to provide suitable power thereto so the tag 602 can transmit a signal to an interrogator 601 via the communication link (e.g., 607, 655, etc.) formed between the devices. It is contemplated that an active tag may be implemented in embodiments where power is coupled to the tag. Additionally, an active tag may be utilized in configurations where data transmitted by the tag is intended to be sensed by an interrogator 601 at a distance greater than may be obtained when using a passive tag. However, it is contemplated that an active tag may be utilized in near field communication embodiments where a passive tag would find suitable utilization.

In one passive tag embodiment, the tag 602 is configured to receive a signal, such as a radio frequency signal from the interrogator 601, and utilize the electromagnetic energy of the received signal to transmit (or reflect) a signal containing some amount of data unique to the tag 602 back to the interrogator 601 via the communication link (e.g., 607, 655, etc.). A passive tag may be utilized in embodiments where an interrogator 601 is positioned less than a critical communication distance from the tag 602. The critical communication distance is generally defined as the distance beyond which electromagnetic signals reflected by the passive tag are not reliably received by the interrogator 601. The critical communication distance may vary according to embodiments depending upon the amount of power associated with the signal generated by the interrogator 601 and the size and power of the tag transmitter.

As described above, a sensor 604 (or multiple sensors) may also be communicatively coupled to the tag 602. In such embodiments, in addition to utilizing remote communication devices 600 for detection, authentication, and data storage, etc., the remote communication devices 600 may also use the sensor 604 to provide a suite of sensing and metrology data to monitor and/or improve the polishing performance of the polishing system.

For example, in some embodiments, the sensor 604 (or multiple sensors in certain embodiments) is configured to detect one or more polishing conditions. In one example, the sensor 604 is a thermal sensor (e.g., RTD, thermocouple) that includes components configured to detect the temperature of the polishing pad 32, the polishing fluid 50, the substrate 10, or any combinations thereof. In another example, the sensor 604 is an acoustic sensor (not shown) configured to determine acoustic vibrational changes during a polishing process.

A conductivity sensor is another type of sensor 604 that may be utilized in the remote communication device 600, according to another embodiment. In this embodiment, the conductivity sensor (not shown) is configured to detect conductivity of the polishing fluid 50 (e.g., the increase in metal concentration (metal loading of the slurry)) or a conductivity change across the surface of polishing pad 32 as a result of the polishing fluid 50 clearing from various regions thereof. In some embodiments, the conductivity sensor includes two electrodes (not shown) that are in communication with the tag 602 and remote communication devices 600, where each of the electrodes are exposed at the surface of a polishing pad 32. The exposed electrodes are used to directly measure the conductivity of the polishing fluid 50, the material surface of the substrate 10, and/or a surface of polishing pad 32 by applying a voltage across the electrodes by use of components found in the tag 602.

Another example of sensor 604 is an accelerometer (e.g., MEMS device) which is configured to sense changes in angular momentum, dynamic forces, vibrational movement out of plane relative to an angular direction of rotation, and/or torque. An additional example of a sensor 604 is a friction sensor, such as a strain gauge, for sensing a shear stress of the polishing pad 32 against a material surface of a substrate 10 during polishing thereof. Yet another embodiment of sensor 604 is a pressure sensor, such as a load cell (e.g., MEMS load cell), configured to measure a force applied to the polishing pad 32 and zonal pressures, such as the pressures applied to regions of the substrate 10 by the flexible diaphragm 108B of the substrate carrier assembly.

Figure 8:
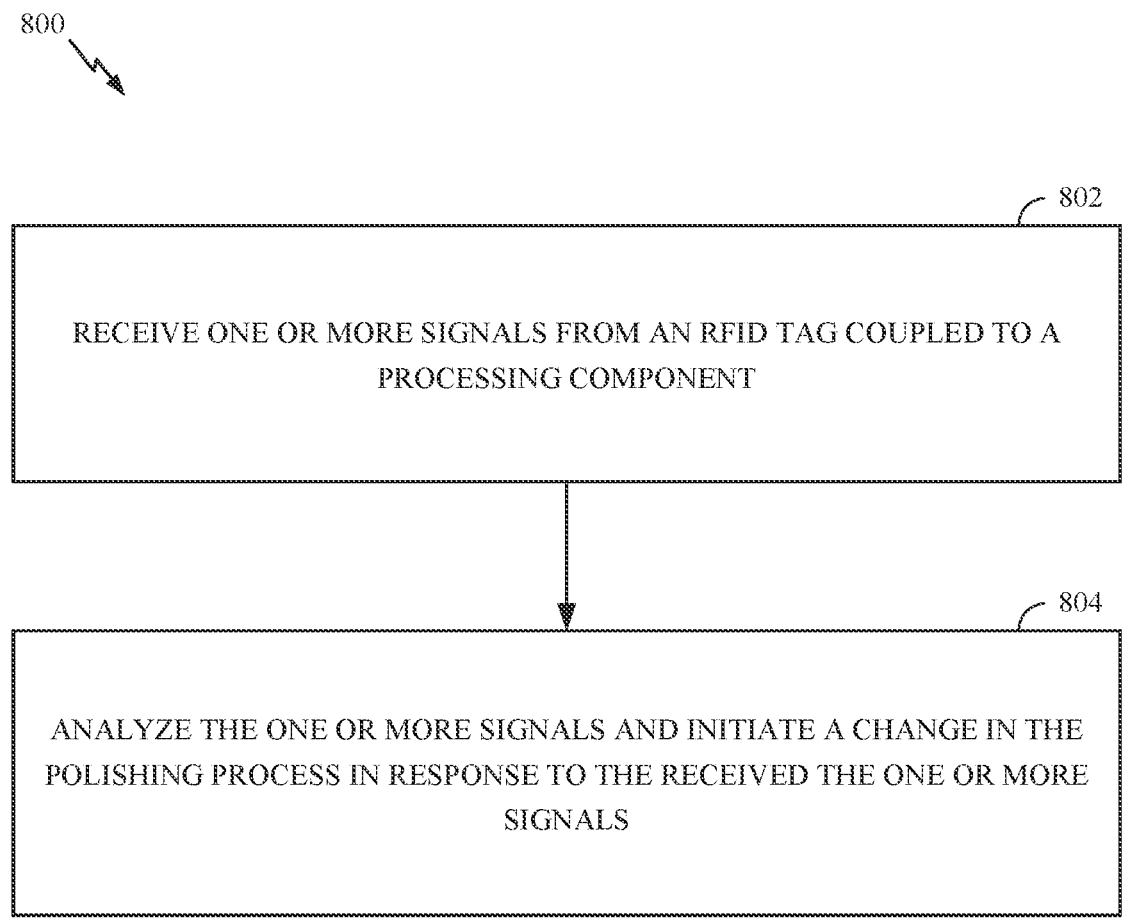
FIG. 8 illustrates example operations for use by a substrate processing system, such as the example substrate processing systems illustrated in FIG. 1A and FIG. 5, in accordance with aspects of the present disclosure.

The aforementioned sensor embodiments may be utilized alone or in combination with one another to more effectively measure processing conditions during polishing. In some embodiments, as described in activities 802 and 804 of example operations 800 in FIG. 8, after receiving and analyzing sensor information from one or more sensors, the controller 612 initiates a change in the polishing process by making in-situ processing and/or real-time adjustments thereto. Such adjustments may be implemented to improve, for example, polishing uniformity and polishing endpoint detection. For example, in one embodiment, polishing performance determined by the remote communication devices 600 is performed in-situ (i.e., during polishing), and process variables are adjusted in-situ to improve substrate polishing performance. Herein, processing conditions that may be sensed include temperature data, pressure data, electrical conductivity data, elastic modulus data, optical data, acoustic data, film thickness data, and other data types configured to measure processing conditions during a substrate polishing process.

Generally, signals generated by the sensor 604 in response to one or more detected processing conditions are encoded by the tag 602 and transmitted by the antenna 606. As described below in relation to FIG. 4, after receiving the sensory signals or information (sensed by the variety of sensors described above) from a remote communication device 600, an interrogator 601 sends the sensory data to the controller 612 for use by polishing system 20 to adjust one or more polishing parameters, such a process recipe variable, in-situ based on the sensory information.

In addition to the components described above, remote communication devices 600 described herein may include memory 603 that is coupled to or integrally manufactured within tag 602. Using the memory 603, in some embodiments, remote communication devices 600 may be used for tracking, detection, and authentication of a processing component as well as changing or improving the configuration of the polishing system 20. In some embodiments, the memory 603 comprises a computer-readable storage media that includes non-volatile memory. For example, in some embodiments, a remote communication device 600 coupled to a processing component will have stored in its memory 603 certain identification information specific to the processing component. Typically, the identification information includes processing component identifier information, part configuration information, history information, failure information, lifecycle data, customer/fab name, processing system information, and any desirable information related thereto. As further described in FIG. 4, the transmission of this information to the controller 612 enables tracking, detection, and authentication of the processing component as well as changing or improving the configuration of the polishing system based on the information contained therein.

Typically, after receiving the sensory and/or identification data from remote communication device 600, the interrogator 601 relays the information to a processor-based system controller, such as controller 612, through wireless or wired communication therewith. For example, in one embodiment, the controller 612 is configured to cause a generation of a signal by the reader 608. In some embodiments, the controller 612 is further configured to receive and analyze data from the remote communication device 600 via the interrogator 601. The controller 612 herein includes a programmable central processing unit (CPU) 614 that is operable with a memory 618 (e.g., non-volatile memory) and a mass storage device, an input control unit, and a display unit (not shown), such as power supplies, clocks, cache, input/output (I/O) circuits, and the like, coupled to the various components of the polishing system 20 to facilitate control of the substrate polishing process. In some embodiments, the controller 612 includes hardware for monitoring substrate processing through system-level sensors in the polishing system 20.

To facilitate control of the polishing system 20 as described above, and more specifically, the remote communication devices 600 and corresponding interrogators 601, the CPU 614 may be one of any form of general-purpose computer processor that can be used in an industrial setting, such as a programmable logic controller (PLC), for controlling various chambers and sub-processors. The memory 618 is coupled to the CPU 614 and the memory 618 is non-transitory and may be one or more of readily available memory such as random access memory (RAM), read-only memory (ROM), floppy disk drive, hard disk, or any other form of digital storage, local or remote. Support circuits 616 are coupled to the CPU 614 for supporting the processor in a conventional manner. Signal generation instructions, data reception, and analysis from the remote communication devices 600 via the interrogator 601 may be performed by and stored in the memory 618, typically as a software routine. The software routine may also be stored and/or executed by a second CPU (not shown) that is remotely located from the hardware being controlled by the CPU 614.

Herein, the memory 618 is in the form of a computer-readable storage media containing instructions (e.g., non-volatile memory), that when executed by the CPU 614, facilitates the operation of the polishing system 20, including operation of the remote communication devices 600 and the interrogator 601. The instructions in the memory 618 are in the form of a program product such as a program that implements the methods of the present disclosure (e.g., middleware application, equipment software application, etc.). The program code may conform to any one of a number of different programming languages. In one example, the disclosure may be implemented as a program product stored on computer-readable storage media for use with a computer system. The program(s) of the program product define functions of the embodiments (including the methods described herein). In some embodiments, the equipment software application 652 and the middleware application 651 are executed by use of the CPU 614 and memory 618 found within the controller 612.

Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

FIG. 4 illustrates a schematic and logical view of a number of program products used by controller 612 for interacting with interrogator 601 and remote communication device 600. At the bottom, FIG. 4 shows a plurality of RDIF tags (e.g., tag $602_1$-$602_N$) in communication with a plurality of RFID readers (e.g., reader $608_1$-$608_N$). In the middle, FIG. 4 further shows middleware application 651, which in some embodiments may reside in memory 618 of controller 612. Generally, a middleware application is a software subsystem capable of providing higher-level software applications with services that are not generally provided by regular operating systems. As shown in FIG. 4, the middleware application 651 isolates the equipment software application 652 from the underlying hardware (e.g., RFID readers and tags).

Starting from the bottom layer of middleware application 651, the hardware abstraction layer 411 provides a logical division of code for separating the hardware layer from the other layers within the middleware application 651. The hardware abstraction layer 411 provides an RFID reader driver interface allowing the event and data management layer to communicate with the RFID readers and tags. In some embodiments, the RFID reader drivers also provide software development kits (SDKs), which are a set of software development tools allowing the creation of applications for the hardware layer. In some embodiments, the hardware abstraction layer 411 further enables the middleware application 651 to interface with hardware, such as RFID readers $608_1$-$608_N$ or tags $601_1$-$601_N$, provided by a variety of vendors.

Moving now to the event and data management layer 412, the event and data management layer 412 includes software code and instructions providing services such as authentication, configuration, cipher (for encryption/decryption), encoding, log viewer, licensing, and user administration. Such services or functionalities are generally not provided by a regular operating system that the controller 612 may store in the memory 618. In addition to the hardware abstraction layer 411 and the event and data management layer 412, the middleware application 651 may include an application abstraction layer 413 for abstracting the implementation details of the functionalities described above. In some embodiments, the application abstraction layer 413 includes a set of application programming interfaces (APIs), which provide clearly defined methods of communication between the middleware application 651 and the equipment software application 652. In addition, in some embodiments, the application abstraction layer includes one or more sockets utilized for communication between the middleware application 651 and the equipment software application 652 through a network.

Sockets allow bidirectional communications such that the equipment software application 652 and the middleware application 651 may both send and receive information therebetween. In some embodiments, the socket-based software runs on two different computer devices allowing communication between the software applications residing on the different computers. In some other embodiments, the sockets are used for local communication between the various software applications on a single computer. Because of the application abstraction layer 413 described above, the middleware application 651 may easily integrate with very minimal customization to the equipment software application 652.

Moving now to the equipment software application 652. Typically, the equipment software application 652 is provided by a provider of the polishing system 20 and/or the processing components used therewith, such as the provider of the substrate carrier assembly 108 and/or the polishing pad 32, etc. In some embodiments, the equipment software application 652 resides in the memory 618 of the controller 612. In some embodiments, the equipment software resides on another computer device, or memory thereof, and communicates with the middleware application 651 through a communication link 657.

In some embodiments, the equipment software application 652 enables RFID tag read and write requests. For example, in one embodiment, the equipment software application 652 provides a user interface for a user/operator to interact therewith. In one such example, the user/operator requests data from the remote communication devices 600 through a read request and/or sends information to be stored by remote communication devices 600 through a write request. As described above, data sent and received between the remote communication devices 600 and the controller 612 enables detection, authentication, and tracking of a processing component as well as changing or improving the configuration of the polishing system.

In one embodiment, the polishing system 20 is configured to engage in operation only when a polishing pad or substrate carrier assembly having remote communication device 600 embedded therein, located thereon, or coupled thereto is installed. In such embodiments, the processing component needs to be detected and authenticated before the polishing system starts the polishing process. As an example, a substrate carrier assembly 108, having a remote communication device 600 coupled thereto, may be installed for use by a processing system user/operator. The remote communication device 600 includes stored information for detection and authentication of the substrate carrier assembly 108, such as part identifier information including the Equipment Supplier's Parts part number, part serial number, part configuration type, etc. After the substrate carrier assembly 108 is installed by the polishing system, user/operator, the remote communication devices 600 coupled to the substrate carrier assembly 108 sends the part identifier information stored in its memory to an interrogator 601, positioned around a radial slot 72 of the carousel support plates 66, through one or more wireless signals communicated therebetween. As described in activity 622 of example operations 620 in FIG. 6, after receiving the one or more signals from the remote communication device 600, the interrogator 601 sends the one or more signals to the middleware application 651 in the controller 612. The middleware application 651 processes the signals to detect and/or authenticate the substrate carrier assembly 108 and/or the processing components thereof, as described in activity 624 of example operations 620 in FIG. 6. For example, in one embodiment, the event and data management layer 412 is configured to compare the processing component identifier information derived from the signals against a number of processing component (part) identifiers stored in a database that is accessible by the middleware application 651. More specifically, the middleware application 651 may parse through a stored database containing a number of Equipment Supplier's Parts (EPS) part numbers as well as all part serial numbers manufactured by the desired equipment supplier. In some embodiments, the database may reside in memory 618 of controller 612. In some other embodiments, the database may reside on another system and may be accessed by the middleware application 651 through a network that is accessible to one or more components within the controller 612.

Based on finding a match for the EPS part number and/or the part serial number, in the example above, the middleware application 651 may detect that the one or more signals are being transmitted by a substrate carrier assembly, e.g., substrate carrier assembly 108, and also authenticate the substrate carrier assembly 108 as an authorized processing component assembly, such as a substrate carrier assembly manufactured by a desired equipment supplier. In addition to the part identifier information, the remote communication devices 600 herein may also transmit processing component (part) configuration information, such as substrate carrier assembly size, flexible diaphragm type, substrate retaining ring type, and/or polishing process information related thereto. Based on the part configuration information, the event and data management layer 412 of the middleware application 651 determines the configuration of the substrate carrier assembly 108 and provides this information to the equipment software application 652 for use in the control of one or more processes performed by the polishing system.

Figure 6:
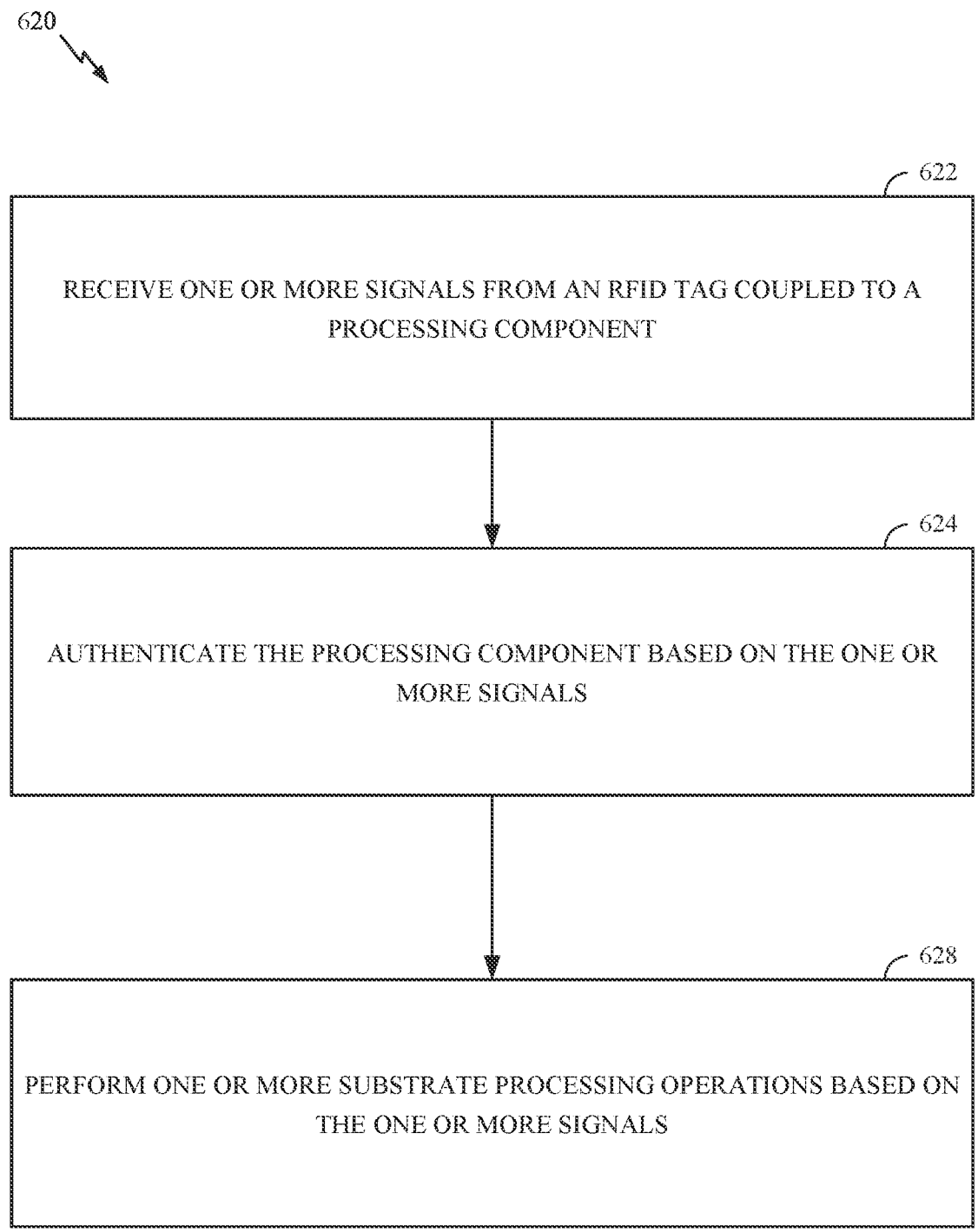
FIG. 6 illustrates example operations for use by a substrate processing system, such as the example substrate processing systems illustrated in FIG. 1A and FIG. 5, in accordance with aspects of the present disclosure.

As described in activity 626 of example operations 620 in FIG. 6, using the information received from a remote communication device 600, the controller 612 performs one or more substrate processing operations. For instance, in some embodiments, the controller 612 is configured by the middleware application 651 to set up or change the configuration of the polishing system 20 based on the configuration of a substrate carrier assembly 108, determined as described above. For example, the polishing system 20 may need to be set to configuration type A if the size of substrate carrier assembly 108 is below a predetermined value, while a configuration type B may be used if the size of the substrate carrier assembly 108 is above the predetermined value. Accordingly, instead of manually setting up and/or adjusting the configuration of the polishing system 20 by a user/operator when changing from one size substrate carrier assembly to another, the controller 612 will automatically perform such functions. Similar to the substrate carrier assembly 108 size example discussed above, the configuration of the polishing system 20 can be customized based on the type of flexible diaphragm 108B and/or substrate retaining ring 108A comprising the substrate carrier assembly 108. In some embodiments, the controller 612 configures the polishing system 20 for a certain type of substrate processing based on the polishing process information received from a remote communication device 600. In some embodiments, the identification information transmitted by a remote communication device 600, as described above, is used by the controller 612 to automatically assign wafer processing and/or handling sequences.

In some embodiments, after authentication of the processing component using the part identifier and configuration information received by the interrogator 601, the controller 612 will "unlock" the polishing system 20 and engage in full polishing or processing functionality. Also, after the authentication phase, in some embodiments, certain locked features of the equipment software application 652 and/or the middleware application 651 are unlocked. For example, in some embodiments, the polishing system 20 is locked to prevent it from performing certain types of polishing processes and/or operations prior to authenticating a required processing component. After authentication, the polishing system 20 may engage in the previously locked polishing process and/or operations. This is to ensure safety and reliability as, in some circumstances, performing certain functions and/or polishing processes using unauthorized and/or incompatible processing components may result in unsafe processing conditions and/or unreliable polishing results.

In addition to the part identifier and part configuration information, in some embodiments, remote communication devices 600 further stores and transmit part history information or assembly history information associated with the processing component to the controller 612. Part history information herein includes installation date, removal date, number of times the part or its associated assembly has been refurbished, current substrate processing count, past failure data, lifetime tracking information, and other information useful to the tracking thereof. In some embodiments, the part history information may be used by the middleware application 651 or the equipment software application 652 to determine whether the processing component is suitable for further use. For example, in some embodiments, an installation date associated with a processing component will indicate how long the processing component has been in use since it was installed.

In addition, for some processing components, in particular consumable components, information relating to substrate processing such as the number of substrates processed and/or the processing conditions associated therewith is indicative of the amount of wear and tear the processing component has incurred. For example, in one embodiment, the controller 612 may identify a processing component or processing component assembly, such as a substrate carrier assembly 108, that has been used for polishing more than a predetermined number of substrates, once the processing component has been identified, the controller 612 may determine that a consumable component of the substrate carrier assembly, such as the substrate retaining ring and/or the flexible diaphragm need to be replaced. In some embodiments, information relating to usage (e.g., substrate count) is inputted by an operating user/operator using an interface provided by the equipment software application 652 and subsequently stored in the remote communication devices 600 through middleware application 651, as described below.

In some embodiments, where the remote communication devices 600 comprise a sensor, tracking information is provided by sensory data. In such embodiments, the sensor 604 is used to track usage statistics of consumable components, such as polishing pads and/or substrate carrier assemblies, including the consumable components thereof. For example, in one embodiment, the number of substrates polished using a polishing pad and/or a substrate carrier assembly is tracked using remote communication devices 600, and the tracking data is concurrently and/or subsequently communicated to an interrogator 601. The tracking data is then interpreted by the controller 612 so that the polishing pad and/or substrate carrier assembly lifetime is more accurately tracked (when compared to a polishing system not using the embodiments described herein) to ensure timely part replacement to provide for improved and/or repeatable polishing performance across the lifetime of the different processing components. In some embodiments, the polishing system 20 adjusts one or more polishing parameters, such as process variable, based on the tracked usage statistics of a consumable component, such as a polishing pad, that was received in the transmitted tag data. In one example, the process variables relating to the use of the substrate carrier assembly 108 (e.g., flexible diaphragm pressure/down force) are adjusted to compensate for changes in the polishing performance experienced by a polishing pad over the polishing pad's lifetime.

As described above, processing component (part) history also includes lifetime tracking data, which, in some embodiments, is used to indicate when, where, and/or how the processing component has been used in the past (e.g., what fabrication facility, what polishing systems, and/or which type of polishing processes, etc.). Lifetime tracking data also includes information about how many hours the processing component has been used which provides an indication of how many and/or which processing components and processing component assemblies (e.g., in case of a substrate carrier assembly, the processing components include a substrate retaining ring, a polishing diaphragm, and/or other consumable components) are nearing the end of their service life, etc. Tracking a part's, or its associated assembly's, history ensures the safety and reliability of the polishing system and the processes performed thereon.

In addition to part history information, in some embodiments, remote communication devices 600 store and transmit lifecycle information to the controller 612. Refurbishment of some processing components is common due to the expense associated with the manufacturing thereof. However, polishing performance requirements and other considerations often limit the number of times a processing component may be refurbished. The lifecycle data of a processing component, determined using the embodiments described herein, provides information regarding how many times the part has been refurbished and if the part has reached a predetermined limit of the number of times, it can be refurbished. In one such example, the controller 612 indicates to the operating user/operator that, for example, the processing component needs to be discarded. In some embodiments, the part history information and lifecycle data stored and transmitted by the remote communication devices 600 is used to determine and/or develop maintenance schedules for the corresponding processing components and/or the polishing system associated therewith.

In some embodiments, the remote communication devices 600 are used to store and transmit processing component and/or processing component assembly failure information to the controller 612. In some embodiments, the failure information relating to the current part's or assembly's inability to perform as desired is inputted by a user/operator using an interface provided by the equipment software application 652. In some embodiments, the failure information is subsequently stored by one or more remote communication devices 600 through the middleware application 651, as further described below. Also, in some embodiments, the failure information is sensed by one or more sensors (e.g., sensor 604) disposed in remote communication devices 600 or other areas within polishing system 20.

Further, in some embodiments, a customer/fab name, and processing system identification (ID) information is stored and transmitted by the remote communication devices 600 to the controller 612. This information indicates where and/or to whom the processing component belongs (e.g., what customer and/or fabrication facility, etc.). Further, using the identification and sensory data transmitted by remote communication devices 600 enables performing failure analysis in a more efficient manner. The results of such failure analysis are typically stored in the remote communication device 600.

In some embodiments, the middleware application 651 provides a diagnostic user interface for tuning an RFID reader's settings. In addition, in some embodiments, the middleware application 651 is configured to encrypt its communication between the RFID reader and the RFID tag for data security. The middleware application 651 herein is further capable of differentiating between multiple RFID tags and engaging in communication with all of them simultaneously. Furthermore, in some embodiments, the middleware application 651 is capable of managing different access privileges of different users.

After the identification and sensory information have been received and processed by the middleware application 651, the middleware application 651 transmits the information, through one or more APIs, to the equipment software application 652. The equipment software application 652 then displays such information in a user interface to the processing system user/operator. As described in relation to FIG. 1B, communication between the remote communication devices 600 and the different layers of the software hierarchy, shown in FIG. 1B, is a two-way communication.

Figure 7:
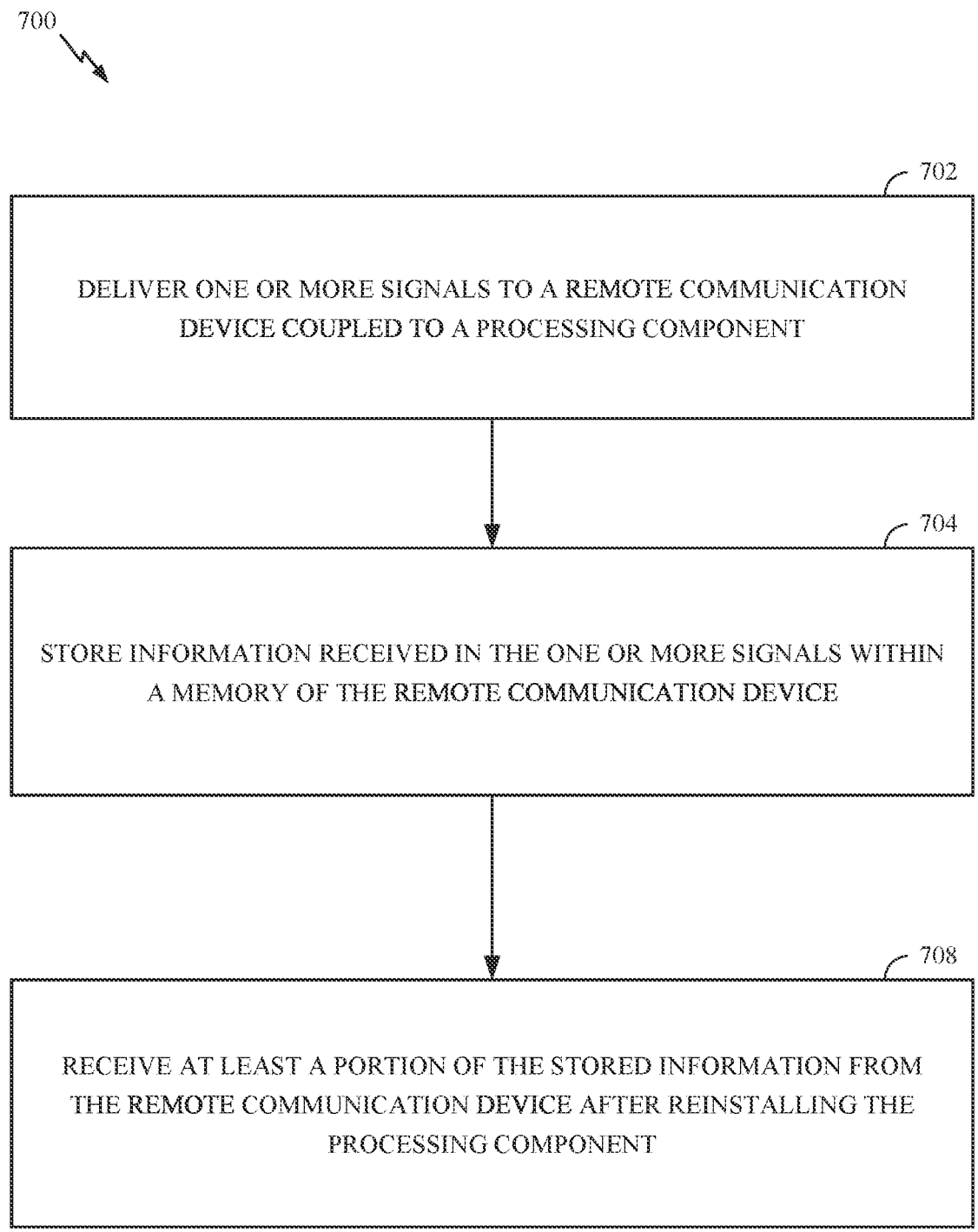
FIG. 7 illustrates example operations for use by a substrate processing system, such as the example substrate processing systems illustrated in FIG. 1A and FIG. 5, in accordance with aspects of the present disclosure.

Accordingly, in some embodiments, the equipment software application 652 accepts requests for read/write operations to the RFID tag memory. In some embodiments, for authentication purposes, the equipment software application 652 is configured to request identification information from a processing component once the remote communication device 600 coupled thereto has been detected. In some embodiments, the equipment software application 652 is configured to make requests for write operations to the memory 603 of the remote communication device 600. In such embodiments, as described in activities 702 and 704 of example operations 700 in FIG. 7, the controller 612 delivers one or more signals to a remote communication device 600 to be stored therein before removing the processing component (e.g., substrate carrier assembly 108) from the polishing system 20. For instance, in some embodiments, failure information is inputted by a system user/operator in a user interface provided by the equipment software application 652. The information is then transmitted to the remote communication devices 600 through an interrogator 601 for storage in the memory 603 thereof. In some embodiments, other identification or sensory information described above travels downstream from the equipment software application 652 to be stored by remote communication devices 600 for later retrieval during subsequent usage.

In some embodiments, the identification and sensory information, collected by the middleware application 651 or the equipment software application 652 from a remote communication device 600, is used for statistical process control (SPC) methods, which are statistical methods typically used for quality control of a semiconductor fabrication process. In such embodiments, data including failure information or analysis (as described above) and processing component and/or processing component assembly configuration information is especially useful with SPC methods, in particular, SPC methods that rely on automated data input. In some embodiments, the SPC methods are implemented and executed by the middleware application 651 or the equipment software application 652. In some other embodiments, the identification and sensory information, collected by the middleware application 651 or the equipment software application 652, is transmitted to the fab-level software application 653, and the SPC methods are executed thereon.

Typically, the fab-level software application 653 resides on a server that is connected to all of the polishing systems and/or the controllers thereof in the fabrication facility. For example, at a typical fabrication facility, identification and sensor information is collected from a large number of processing components (e.g., substrate carrier assemblies) being used by a number of different polishing systems, such as the polishing system 20 described herein. In such an example, after performing SPC methods, certain trends regarding the specific type of substrate carrier assembly used by these polishing systems are derived by the fab-level software application 653. As an example, the processed identification and sensory information may indicate that the certain substrate carrier assembly used for polishing substrates having memory devices formed thereon has a higher failure rate than the same substrate carrier assembly when used to polish substrates having logic devices formed thereon. This information may then be used by different parties involved (e.g., system users/operators, part manufacturers, etc.) to make changes to the polishing process and/or processing components, etc. In addition to the fab-level software application 653, in some embodiments, the identification and sensory data is further transmitted to the polishing system manufacturer and/or the processing component supplier via an external communication link formed with the controller 612 or a fab-level controller (not shown) to provide an update about the status of the processing component. This information provides extra visibility into the status of the processing component after it is installed and detected by the polishing system, during the polishing process, and after the process has ended.

As described above, the methods and apparatus described herein may be utilized by tools or devices other than a polishing system 20. The description relating to one or more polishing components, processing component assemblies, and polishing processes provided herein is not intended to be limiting as to the scope of the disclosure provided herein, and one or more of the embodiments disclosed provided herein can thus be used with any type of tool or device that contains processing components and/or processing component assemblies that are replaceable, consumable, and/or have a limited useful lifetime, such as the physical vapor deposition (PVD) chamber described in FIG. 5.

Figure 5:
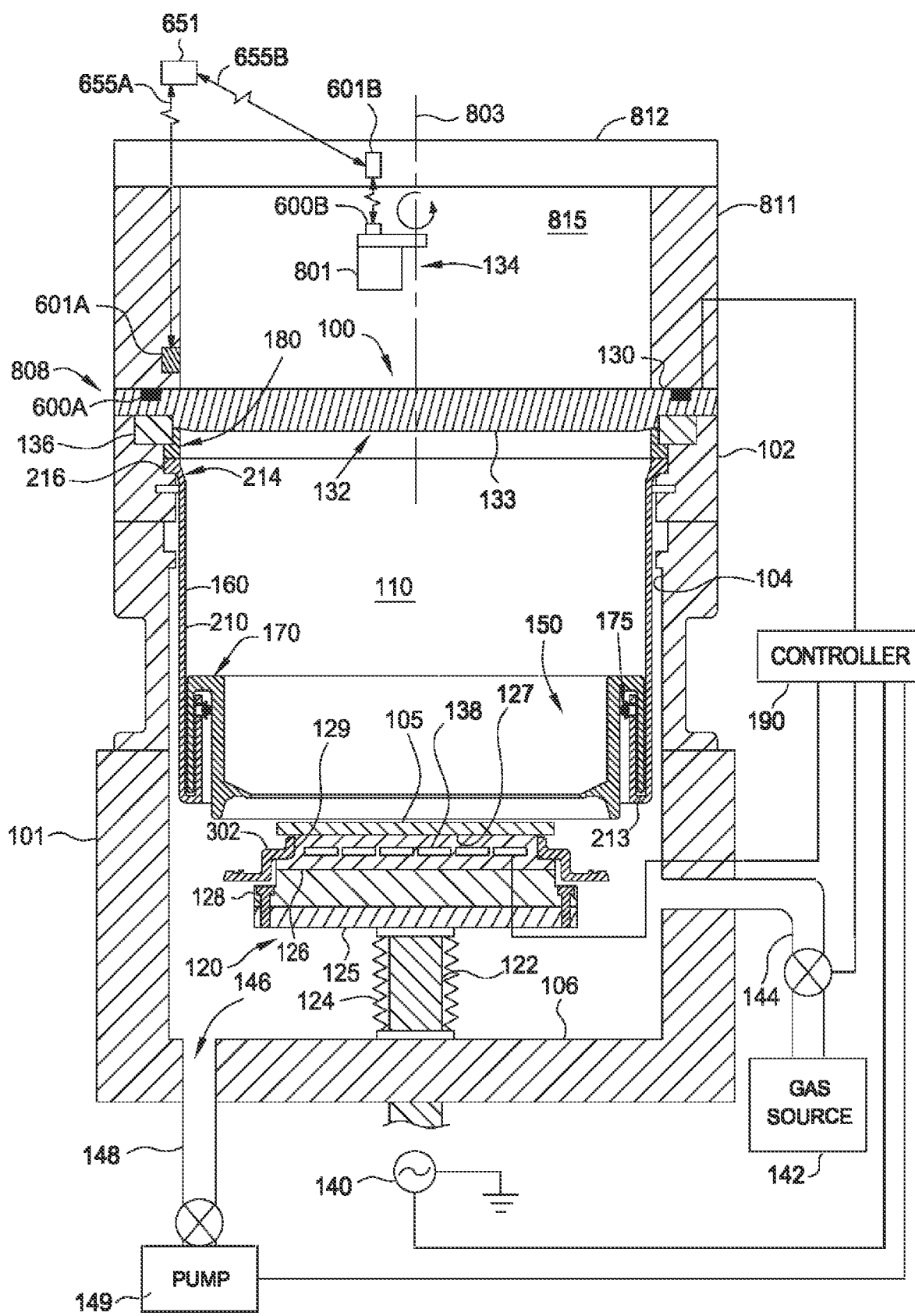
FIG. 5 is a schematic cross-sectional view of another example of a substrate processing system, here a physical vapor deposition (PVD) processing chamber, adapted to benefit from the embodiments described herein.

FIG. 5 is a schematic cross-sectional view of another example of a substrate processing system, herein a physical vapor deposition (PVD) processing chamber, that may be adapted to benefit from the embodiments described herein. Other examples of processing chambers that may be adapted to benefit from the embodiments provided herein is the ALPS® Plus and SIP ENCORE® PVD processing chamber, available from Applied Materials, Inc. of Santa Clara, Calif. However, it is contemplated that other processing chambers, including those from other manufacturers, may be adapted to benefit from the embodiments described herein. The processing chamber 100 described herein is configured to deposit titanium or aluminum oxides or nitrides on a substrate 105. In other embodiments, the processing chamber 100 is used for other purposes, for example, to deposit aluminum, copper, tantalum, tantalum nitride, tantalum carbide, tungsten, tungsten nitride, lanthanum, lanthanum oxides, titanium, or combinations thereof.

The processing chamber 100 includes a chamber body 101 having one or more upper adapters 102 and one or more sidewall adapters 104, a chamber bottom 106, and a lid assembly 808 that define an interior volume 110. The chamber body 101 is typically fabricated by machining and welding plates of stainless steel or by machining a single mass of aluminum. In one embodiment, the sidewall adapters 104 comprise aluminum, and the chamber bottom 106 comprises stainless steel. The lid assembly 808 of the processing chamber 100, in cooperation with a ground shield 160 that interleaves with a cover ring 170, substantially confines a plasma formed in the interior volume 110 to a region above the substrate 105.

The processing chamber 100 further includes a substrate support assembly 120 disposed in the interior volume 110, which includes a substrate support 126 sealingly coupled to a base plate 128, which is coupled to a ground plate 125. The substrate support assembly 120 is disposed on a support shaft 122 movably disposed and sealingly extending through the chamber bottom 106. The support shaft 122 is coupled to an actuator (not shown) that is configured to raise and lower the support shaft 122, and thus the substrate support assembly 120 disposed thereon, to facilitate processing of a substrate 105 and transfer thereof to and from the processing chamber 100. A bellows 124 circumscribes the support shaft 122 and is coupled to the substrate support assembly 120 and the chamber bottom 106 to provide a flexible seal therebetween and to maintain the vacuum integrity of the interior volume 110.

The substrate 105 is transferred into and out of the processing chamber 100 through an opening (not shown) formed through the chamber body 101, which is conventionally sealed with a door or a valve (not shown). In some embodiments, the processing chamber 100 is coupled to a transfer chamber and/or other chambers of a substrate processing system. Typically, a plurality of lift pins (not shown) are movably disposed through the substrate support assembly 120 to facilitate transferring of the substrate 105 to and from a substrate receiving surface 127 of the substrate support 126. When the substrate support assembly 120 is in a lowered position, the plurality of lift pins extend above the substrate receiving surface 127, thereby spacing the substrate 105 from the substrate support 126 for access by a robot handler. When the substrate support assembly 120 is in a raised processing position, the tops of the plurality of lift pins are located flush with, or below, the substrate receiving surface 127, and the substrate 105 rests directly on the substrate receiving surface 127 for processing. The relative position of the tops of the lift pins and the substrate receiving surface 127 of the substrate support 126 can be changed by contact of their lower ends with a stationary or movable pin plate (not shown), or with the chamber bottom 106 of the processing chamber 100 as the substrate support 126 is lowering in the interior volume 110 of the processing chamber 100.

Typically, the substrate support 126 is comprised of aluminum, ceramic, or a combination thereof. In some embodiments, the substrate support 126 comprises an electrostatic chuck and is formed of a dielectric material having a chucking electrode 138 embedded therein. In some embodiments, the substrate support 126 and/or the base plate 128 coupled thereto are configured to heat and/or cool the substrate using a resistive heating element (not shown) and/or cooling channels (not shown) disposed therein. Typically, the cooling channels are in fluid communication with a coolant source (not shown), such as a refrigerant source or a temperature-controlled fluid source. Herein, the substrate support assembly 120 supports the deposition ring 302 along with the substrate 105 during the deposition process.

The lid assembly 808 generally includes a target backing plate 130, a target 132, and a magnetron 134. The target backing plate 130 is supported by the upper adapters 102 when in the lid assembly 808 is in a closed position, as shown in FIG. 5. A ceramic ring seal 136 is disposed between the target backing plate 130 and upper adapters 102 to prevent vacuum leakage therebetween.

The target 132 is coupled to the target backing plate 130 and exposed to the interior volume 110 of the processing chamber 100. The target 132 provides the material which is to be deposited on the substrate 105 during a PVD process. An isolator ring 180 is disposed between the target 132, target backing plate 130, and chamber body 101 to electrically isolate the target 132 from the target backing plate 130 and the upper adapter 102 of the chamber body 101.

The target 132 is biased with RF and/or DC power relative to ground, e.g., the chamber body 101, by a power source 140. A gas, such as argon, is supplied to the interior volume 110 from a gas source 142 via conduits 144. The gas source 142 may comprise a non-reactive gas such as argon or xenon, which is capable of energetically impinging upon and sputtering material from the target 132. Spent process gas and byproducts are exhausted from the interior volume 110 of the processing chamber 100 through exhaust ports 146 that receive spent process gas and direct the spent process gas to an exhaust conduit 148 having a throttle valve to control the pressure of the gas in the interior volume 110 of the processing chamber 100. The exhaust conduit 148 is fluidly coupled to one or more exhaust pumps 149. Typically, the pressure of the sputtering gas in the interior volume 110 of the processing chamber 100 is set to sub-atmospheric levels, such as a vacuum environment, for example, gas pressures of about 0.6 mTorr to about 400 mTorr. A plasma is formed from the gas between the substrate 105 and the target 132. Ions within the plasma are accelerated toward the target 132 and cause material to become dislodged from the surface 133 thereof. The dislodged target material is deposited on the substrate. The magnetron 134 is disposed over the target backing plate 130 and within a target region 815 that is enclosed by a dielectric support 811 and a dielectric target lid 812 that are positioned on the processing chamber 100. In some embodiments, the dielectric target lid 812 includes a motor (not shown) that is coupled to the magnetron 134 so that it can be moved about an axis 803 within the target region 815 during processing.

Processes performed in the processing chamber 100 are controlled by a controller 190 that comprises a program code having instruction sets to operate components of the processing chamber 100 to facilitate the processing of substrates therein. For example, in one embodiment, the controller 190 comprises a program code that includes a substrate positioning instruction set to position the substrate support assembly 120; a gas flow control instruction set to operate gas flow control valves to set a flow of sputtering gas to the interior volume 110 of the processing chamber 100; a gas pressure control instruction set to operate a throttle valve to maintain a pressure in the interior volume 110; a process sputtering power control instruction set to power the target 132; a temperature control instruction set to control a temperature control system (not shown) in the substrate support assembly 120 or sidewall adapter 104 to set temperatures of the substrate or sidewall adapters 104, respectively; and a process monitoring instruction set to monitor the process in the processing chamber 100. The instruction sets provided by the controller 190 to the processing chamber 100 comprise a set of deposition process parameters, herein deposition process variables, which together comprise a deposition process recipe. Examples of deposition process variables herein include, but are not limited to, the distance between a surface of the substrate 105 and the surface of the target 132, the bias power provided to the target 132, the temperature of the substrate support 126 and/or the substrate 105 disposed thereon, flowrate(s) of the sputtering gas(es) and/or reactive gases into the processing chamber 100, pressure in the interior volume 110, deposition duration (time), speed of the magnetron 134 about the axis 803, and in some embodiments a substrate bias power provided to a bias electrode (not shown) disposed in the substrate support 126. Often, specific types of processing components are required for use with some deposition process recipes and are prohibited for use with other deposition process recipes as some types of processing components are incompatible with some substrate deposition processes and are therefore unauthorized for use therewith.

Typically, the processing chamber 100 includes a process kit 150 that comprises various processing components that can be easily removed from the processing chamber 100, for example, to clean sputtering deposits off the component surfaces, replace or repair eroded components, or to adapt the processing chamber 100 for other processes and/or applications. In one embodiment, the process kit 150 comprises a ground shield 160, an interleaving cover ring 170, and a centering mechanism 175 for providing a controlled gap between the one-piece ground shield 160 and the interleaving cover ring 170. In some embodiments, the process kit 150 further comprises the deposition ring 302.

Herein, one or more remote communication devices 600 are located on, embedded in, disposed within, or otherwise coupled to various areas of processing chamber 100 and/or the processing components disposed therein. In one embodiment, a first remote communication device 600A is located on, embedded in, disposed within, or otherwise coupled to the target 132 and is in communication with a first interrogator 601A located on, embedded in, disposed within, or otherwise coupled to the dielectric support 811 of the chamber body 101 and adjacent to the magnetron 134. In another embodiment, a second remote communication device 600B located on, embedded in, disposed within, or otherwise coupled to a magnet 801 of the magnetron 134 is in communication with a second interrogator 601B located on, embedded in, disposed within, or otherwise coupled to a yoke or a process piece, as shown in FIG. 5. As further shown in FIG. 5, interrogators 601A and 601B use communication links 655A and 655B, respectively, to communicate with the middleware application 651, which in some embodiments, resides on the controller 190. In some embodiments, the communication links 655A and 655B are wired connections and, in other embodiments, are wireless communication protocols.

Herein the remote communication devices 600A and 600B operate to enable the same functionalities as described above in relation to the polishing system 20 described in FIGS. 1-4, including detection, authentication, and tracking of processing components (e.g., target 132) as well as setting up, reconfiguration, or unlocking of certain differentiated features within the processing chamber 100. Accordingly, once identification information stored in the remote communication devices 600A and 600B is received through signals by the interrogators 601A and 601B, respectively, the information may travel through the same software application hierarchy described in relation to FIG. 4. The two-way communication between the remote communication device 600A-B and the different levels of software applications (e.g., 651, 652, and 653) therefore enable the functionalities described above and also allow for storing information in the remote communication device 600A and 600B.

For example, certain information specific to processing components such as the target 132 and/or the magnet 801 is stored in the remote communication devices 600A and/or 600B, respectively. Similar to the substrate carrier assembly 108 of polishing system 20, the target 132 and/or the magnet 801 are also detected and authenticated using the information stored in their respective remote communication devices 600A-B, which in some embodiments are RFID tags. In one example, after the authentication, as described in relation to FIG. 4, certain processes or operations may be unlocked based on the type of magnet and/or type of target identified through the identification information. For example, in one embodiment, the processing chamber 100 is locked from performing certain types of PVD deposition operations until authentication of the remote communication device containing part(s). After authentication, for example, the processing chamber 100 is unlocked and may engage in the previously locked deposition process variable regimes. In one example, based on information received from the remote communication device 600A and/or 600B, the equipment software application 652 will allow the DC or RF power levels applied to the target 132 or temperature set points applied to the substrate support assembly 120 to be increased or decreased based on the received information by the middleware application 651. In one case, if one of the remote communication devices 600A and/or 600B is not present within the system, then the capability of changing one or more process variables within the equipment software application 652 may not be allowed. In some cases, the use of unauthorized and/or incompatible processing components may result in unsafe operating conditions and/or unreliable processing results. The ability to interlock set points of various process variables due to the presence or status of a remote communication device 600A and/or 600B containing part ensures the safety and reliability of the deposition processes in a processing chamber or processing system.

In some embodiments, the remote communication device 600A-B, interrogators 601A-B, and the controller 190 of the processing chamber 100 include the same components and operate in a similar manner to the remote communication device 600, interrogator 601, and the controller 612 of the polishing system 20, respectively, as described in FIGS. 1-4.

It is also important to note that the embodiments described above may not be limited to CMP devices and PVD processing chambers as other types of devices may also utilize wireless communication devices to enable detection, authentication, and tracking of processing components, including the consumable components and non-consumable components disposed therein.

What is claimed is:

1. A method of processing a substrate using a substrate processing system, comprising:
   receiving, using an interrogator, one or more signals from a remote communication device, wherein the one or more signals comprise sensory information relating to one or more substrate processing conditions detected by a sensor communicatively coupled to the remote communication device;
   analyzing the sensory information using a controller adapted to control a process performed within the substrate processing system;
   determining that a processing component is authorized for use with a process recipe;

unlocking the process recipe based on the determination that the processing component is authorized for use with the process recipe;
changing, using the controller, a substrate processing parameter based on the received sensory information; and
processing the substrate using the unlocked process recipe.

2. The method of claim 1, wherein the sensory information comprises at least one of temperature data, pressure data, electrical conductivity data, elastic modulus data, optical data, acoustic data, film thickness data, or a combination thereof.

3. The method of claim 1, wherein the sensor comprises a thermal sensor, an acoustic sensor, a conductivity sensor, or an accelerometer.

4. The method of claim 1, further comprising:
receiving user input from a user interface application through one or more application programming interfaces (APIs); and
sending, using the interrogator, the user input to the remote communication device for storage in a memory thereof.

5. The method of claim 1 wherein the substrate processing system is one of a chemical mechanical polishing (CMP) system, a chemical vapor deposition (CVD) chamber, a physical vapor deposition (PVD) chamber, an ion implantation chamber, an etch processing chamber or system, a photolithography processing system, or a substrate thinning system.

6. The method of claim 1, further comprising:
encoding, using the remote communication device, one or more signals received from the sensor to generate the sensory information; and
sending, using the remote communication device, the sensory information to the interrogator.

7. The method of claim 1, further comprising:
receiving, at the controller, identifier information relating to the processing component, wherein the identifier information is stored in a memory of the remote communication device.

8. The method of claim 1, wherein analyzing the sensory information comprises generating usage data related to the processing component.

9. The method of claim 8, wherein the substrate processing parameter is changed based on the generated usage data.

10. The method of claim 8, further comprising:
sending, using the interrogator, the usage data to the remote communication device for storage in a memory thereof.

11. A method of processing a substrate using a substrate processing system, comprising:
receiving, using an interrogator, one or more signals from a remote communication device, wherein the remote communication device is coupled to a processing component disposed in the substrate processing system, the one or more signals comprise sensory information relating to one or more substrate processing conditions detected by a sensor communicatively coupled to the remote communication device, and the one or more signals comprise identifier information relating to the processing component;
analyzing the one or more signals using a controller adapted to control a process performed within the substrate processing system;
determining that the processing component is authorized for use with a process recipe;
unlocking the process recipe based on the determination that the processing component is authorized for use with the process recipe;
changing, using the controller, a substrate processing parameter based on the analysis of the one or more signals; and
processing the substrate using the unlocked process recipe.

12. The method of claim 11, wherein the sensor comprises a thermal sensor, an acoustic sensor, a conductivity sensor, or an accelerometer.

13. The method of claim 11, wherein the sensory information comprises at least one of temperature data, pressure data, electrical conductivity data, elastic modulus data, optical data, acoustic data, film thickness data, or a combination thereof.

14. A substrate processing system, comprising:
a processing component;
a remote communication device coupled to the processing component;
one or more sensors communicatively coupled to the remote communication device;
an interrogator disposed in wireless communication with the remote communication device;
a system controller; and
a non-transitory computer-readable medium having instructions stored thereon for performing a method of processing a substrate when executed by a processor, the method comprising:
receiving, using the interrogator, one or more signals from the remote communication device, wherein the one or more signals comprise sensory information relating to one or more substrate processing conditions detected by the one more sensors;
analyzing the sensory information using the controller;
determining that the processing component is authorized for use with a process recipe;
unlocking the process recipe based on the determination that the processing component is authorized for use with the process recipe;
changing, using the controller, a substrate processing parameter based on the received sensory information; and
processing the substrate using the unlocked process recipe.

15. The substrate processing system of claim 14, wherein the one or more sensors comprise one or more of a thermal sensor, an acoustic sensor, a conductivity sensor, or a combination thereof.

16. The substrate processing system of claim 14, wherein the sensory information comprises at least one of temperature data, pressure data, electrical conductivity data, elastic modulus data, optical data, acoustic data, film thickness data, or a combination thereof.

17. The substrate processing system of claim 14, wherein analyzing the sensory information comprises generating usage data related to the processing component.

18. The substrate processing system of claim 17, wherein the method further comprises:
sending, using the interrogator, the usage data to the remote communication device for storage in a memory thereof.

* * * * *